(12) United States Patent
Mann et al.

(10) Patent No.: US 7,334,347 B2
(45) Date of Patent: Feb. 26, 2008

(54) PROCESS FOR PRODUCING DRIED, SINGULATED FIBERS USING STEAM AND HEATED AIR

(75) Inventors: Christopher A. Mann, Marysville, WA (US); Christopher Q. Tveter, Auburn, WA (US)

(73) Assignee: Weyerhaeuser Company, Federal Way, WA (US)

( * ) Notice: Subject to any disclaimer, the term of this patent is extended or adjusted under 35 U.S.C. 154(b) by 709 days.

(21) Appl. No.: 10/923,447

(22) Filed: Aug. 20, 2004

(65) Prior Publication Data

US 2005/0086828 A1   Apr. 28, 2005

Related U.S. Application Data

(63) Continuation-in-part of application No. 10/187,041, filed on Jun. 28, 2002, now Pat. No. 6,862,819, which is a continuation-in-part of application No. 10/051,392, filed on Jan. 16, 2002, now Pat. No. 6,782,637, which is a continuation-in-part of application No. 09/998,143, filed on Oct. 30, 2001, now Pat. No. 6,748,671.

(51) Int. Cl.
    *F26B 3/08* (2006.01)
(52) U.S. Cl. .............................. 34/359; 34/83; 34/443; 162/63; 162/55
(58) Field of Classification Search .................. 34/443, 34/326, 221, 83, 359, 413; 604/374, 367; 162/55, 65, 63
See application file for complete search history.

(56) References Cited

U.S. PATENT DOCUMENTS

| 2,991,946 A | 7/1961 | Croft |
| 3,268,954 A | 8/1966 | Joa |
| 3,329,418 A | 7/1967 | Stephanoff et al. |
| 3,415,456 A | 12/1968 | Bidwell |
| 3,440,135 A | 4/1969 | Chung |
| 3,491,953 A | 1/1970 | Stephanoff |
| 3,543,351 A | 12/1970 | George |

(Continued)

FOREIGN PATENT DOCUMENTS

CA   947915   5/1974

(Continued)

OTHER PUBLICATIONS

Bentley, S., "An Apparatus for Producing Air-Formed Handsheets," *Pulp and Paper Research Institute of Canada*, pp. A11-A17.

(Continued)

*Primary Examiner*—Kenneth Rinehart
*Assistant Examiner*—Camtu Nguyen
(74) *Attorney, Agent, or Firm*—Christensen O'Conner Johnson Kindness

(57) ABSTRACT

Dried, singulated cellulose pulp fiber is produced by introducing wet pulp steam and air into a jet dryer. The air is heated to a temperature of 250° C. to 600° C. Steam is injected at a nozzle pressure of from 344 KPa (50 psig) to 4,137 KPa (600 psig). The pulp is removed from the jet dryer and separated from the air. The product formed has advantageous properties such as low fines count, improved kink curl and twist, and high permeability.

8 Claims, 11 Drawing Sheets

U.S. PATENT DOCUMENTS

| | | |
|---|---|---|
| 3,554,862 A | 1/1971 | Hervey et al. |
| 3,554,863 A | 1/1971 | Hervey et al. |
| 3,667,131 A | 6/1972 | Stephanoff |
| 3,802,089 A | 4/1974 | Stephanoff |
| 3,898,157 A | 8/1975 | Hooper |
| 3,927,479 A | 12/1975 | Stephanoff |
| 3,945,130 A | 3/1976 | Stephanoff |
| 3,974,574 A | 8/1976 | Van Vliet et al. |
| 3,977,089 A | 8/1976 | Forster et al. |
| 3,987,968 A | 10/1976 | Moore et al. |
| 4,033,853 A | 7/1977 | Hann |
| 4,036,679 A | 7/1977 | Back et al. |
| 4,065,347 A | 12/1977 | Åberg et al. |
| 4,098,006 A | 7/1978 | Maffet |
| 4,099,336 A | 7/1978 | Maffet |
| 4,110,195 A | 8/1978 | Harding |
| 4,121,349 A | 10/1978 | Maffet |
| 4,128,946 A | 12/1978 | Maffet |
| 4,161,825 A | 7/1979 | Maffet |
| 4,183,146 A | 1/1980 | Tsukamoto et al. |
| 4,198,004 A | 4/1980 | Albus et al. |
| 4,204,055 A | 5/1980 | Lesas et al. |
| 4,214,375 A | 7/1980 | Albus et al. |
| 4,226,027 A | 10/1980 | Albus |
| 4,253,822 A | 3/1981 | Marsh |
| 4,259,958 A | 4/1981 | Goodbar |
| 4,347,128 A | 8/1982 | Barnscheidt |
| 4,489,503 A | 12/1984 | Browne et al. |
| 4,506,834 A | 3/1985 | Ek |
| 4,528,995 A | 7/1985 | Korte et al. |
| 4,547,263 A | 10/1985 | Quame |
| 4,557,800 A | 12/1985 | Kinsley, Jr. |
| 4,594,793 A | 6/1986 | Carlson |
| 4,613,627 A | 9/1986 | Sherman et al. |
| 4,650,127 A | 3/1987 | Radwanski et al. |
| 4,668,339 A | 5/1987 | Terry |
| 4,671,860 A | 6/1987 | Huddleston, Jr. et al. |
| 4,701,857 A | 10/1987 | Robinson |
| 4,718,178 A | 1/1988 | Whipple |
| 4,799,961 A | 1/1989 | Friberg |
| 4,919,340 A | 4/1990 | Gerber |
| 5,007,181 A | 4/1991 | Jackson et al. |
| 5,176,793 A | 1/1993 | Kurtz |
| 5,181,987 A | 1/1993 | Breuker et al. |
| 5,188,298 A | 2/1993 | Gerber |
| 5,225,047 A | 7/1993 | Graef et al. |
| 5,252,275 A | 10/1993 | Sultze et al. |
| 5,266,211 A | 11/1993 | Breuker et al. |
| 5,279,046 A | 1/1994 | Vincent |
| 5,437,418 A | 8/1995 | Graef et al. |
| 5,527,432 A | 6/1996 | Leuthold et al. |
| 5,556,976 A | 9/1996 | Jewell |
| 5,564,635 A | 10/1996 | Terada et al. |
| 5,634,281 A | 6/1997 | Nugent |
| 5,643,359 A | 7/1997 | Soroushian et al. |
| 5,709,774 A | 1/1998 | Naieni |
| 5,722,603 A | 3/1998 | Costello et al. |
| 5,800,418 A | 9/1998 | Ahr |
| 5,816,507 A | 10/1998 | Skali Lami et al. |
| 5,873,979 A | 2/1999 | Naieni |
| 5,913,588 A | 6/1999 | Legros et al. |
| 5,989,335 A | 11/1999 | Soroushian et al. |
| 6,074,524 A | 6/2000 | Wu et al. |
| 6,159,335 A | 12/2000 | Owens et al. |
| 6,171,443 B1 | 1/2001 | Goettmann et al. |
| 6,184,271 B1 | 2/2001 | Westland et al. |
| 6,296,736 B1 | 10/2001 | Hsu et al. |
| 6,296,737 B1 | 10/2001 | Wu et al. |
| 6,383,336 B1 | 5/2002 | Shannon |
| 6,436,231 B1 | 8/2002 | Graef et al. |

FOREIGN PATENT DOCUMENTS

| | | |
|---|---|---|
| CA | 993618 | 7/1976 |
| CA | 1017519 | 9/1977 |
| CA | 1124451 | 6/1982 |
| DE | 30 03 971 A1 | 8/1980 |
| EP | 0 773 768 B1 | 1/2000 |
| EP | 0 845 966 B1 | 3/2000 |
| GB | 1 405 079 | 9/1975 |
| WO | WO 94/10953 A1 | 5/1994 |
| WO | WO 97/25575 | 7/1997 |

OTHER PUBLICATIONS

Larsson, O. and B. Lindström, "Recent Developments in Pulp Drying," *World Pulp and Paper Week*, Stockholm, Jun. 4-7, 1996, pp. 875-884.

Sarigaphuti, M., et al., "Shrinkage Cracking and Durability Characteristics of Cellulose Fiber Reinforced Concrete," *ACI Materials Journal* 90(4):309-318, Jul.-Aug. 1993.

PROCESS FOR PRODUCING DRIED, SINGULATED FIBERS USING STEAM AND HEATED AIR

RELATED APPLICATIONS

This application is a continuation-in-part of U.S. application Ser. No. 10/187,041, filed Jun. 28, 2002, now U.S Pat. No. 6,862,819 which is a continuation-in-part of Ser. No. 10/051,392, filed Jan. 16, 2002, now U.S. Pat. No. 6,782,637 which is a continuation-in-part of Ser. No. 09/998,143, filed Oct. 30, 2001, now U.S. Pat. No. 6,748,671 B1, the benefit of the filing dates of which are hereby claimed under 35 U.S.C. § 120.

FIELD OF THE INVENTION

The present invention relates to a system for producing dried, singulated cellulose pulp fibers, and more particularly, a system for producing dried, singulated cellulose pulp fibers using a jet dryer, most preferably with injected steam.

BACKGROUND OF THE INVENTION

Dried, singulated cellulose pulp fibers are desirable for many products from absorbent personal articles to a strengthener in concrete. Currently, in the most common process of making singulated fibers, a roll of conventional pulp fibers is hammermilled into singulated fibers. This process is energy-intensive, requiring an additional drying stage. Further, the current hammermilling process often produces fibers with undesirable physical properties, such as low kink, curl, and twist.

This dried, singulated pulp will also contain knots of fiber, sometimes referred to as nits or nodules. Knots are fiber clumps that remain strongly adhered to one another, as can be seen by placing a small portion of pulp into a clear beaker of water and stirring the water to mix the fibers. Most of the fiber will mix into the water as singular fibers; however, there will be fiber clumps that are readily visible. The fiber clumps or knots are undesirable by-products of the hammermilling process. The amount of knots in a pulp that has been hammermilled can be quantified by using a screening system with acoustical energy used as the means to classify the fiber into sizes of knots, accepts, and fines. It is desirable to have low knots and fines and high accepts where the accepts are the singulated fibers.

Canadian Patent No. 993618 (Estes, 1976) describes a process for producing a low density fluff pad or batt from individual fibers that have significant kink and interlocking to provide improved batt strength and higher bulk. In accordance with the process, wet pulp is separated into individual fibers during the drying stage. The process uses fluid jet drying equipment that employs air-jets or steam-jets for separating the fibers. The fibers are laid on a perforated screen upon exiting from the jet dryer. The fibers produced from this reference were dried at a temperature of 204° C. with no mention of knots. At that temperature, the throughput will be uneconomically low. United States Patent Publication No. US 2003/0182818 A1 describes a process for producing individual fibers utilizing a jet dryer. This publication suggests the use of steam injected into the jet dryer to reduce the numbers of knots in the resulting fiber. It has been found that the injection of steam does reduce the number of knots or nits in the final fiber.

SUMMARY OF THE INVENTION

This invention provides an improved dried, singulated cellulose pulp fiber product and an improved method for forming singulated and dried fibers that have a relatively low knot content. In accordance with the process, wet pulp, steam, and air are introduced into a jet dryer. In accordance with the present invention, the air is heated to a temperature of from 250° C. to about 600° C. before being injected into the dryer. The steam is injected at a nozzle pressure of from 344 Kpa (50 psig) to 4137 Kpa (600) psig. The pulp is dried in the jet dryer to form singulated pulp fibers. The pulp is removed from the jet dryer and separated from the air. The process may be used on several types of feed pulp and on treated feed pulp. The product formed by the process has advantageous properties such as a low knot count, a low fines count, high permeability, as well as improved kink, curl and twist.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides an improved process for drying, treatment, and singulation of pulp into individual fibers with few knots or nodules. As used herein the term "dried" in regards to fibers is a term of art generally indicating a weight percentage of water between 2% and 10%, but may fall above or below this range. As used herein the term "air" is not limited to pure air but may include any gas consistent with the present invention. As used herein the term "consistency" means the percentage of solids content of a liquid and solid mixture. The specific examples set forth below are directed to the drying, treatment, and singulation of cellulose pulp fibers. However, it should be understood that the present invention is also suitable for use in processing other types of natural fibers and/or synthetic fibers.

Figure 1:
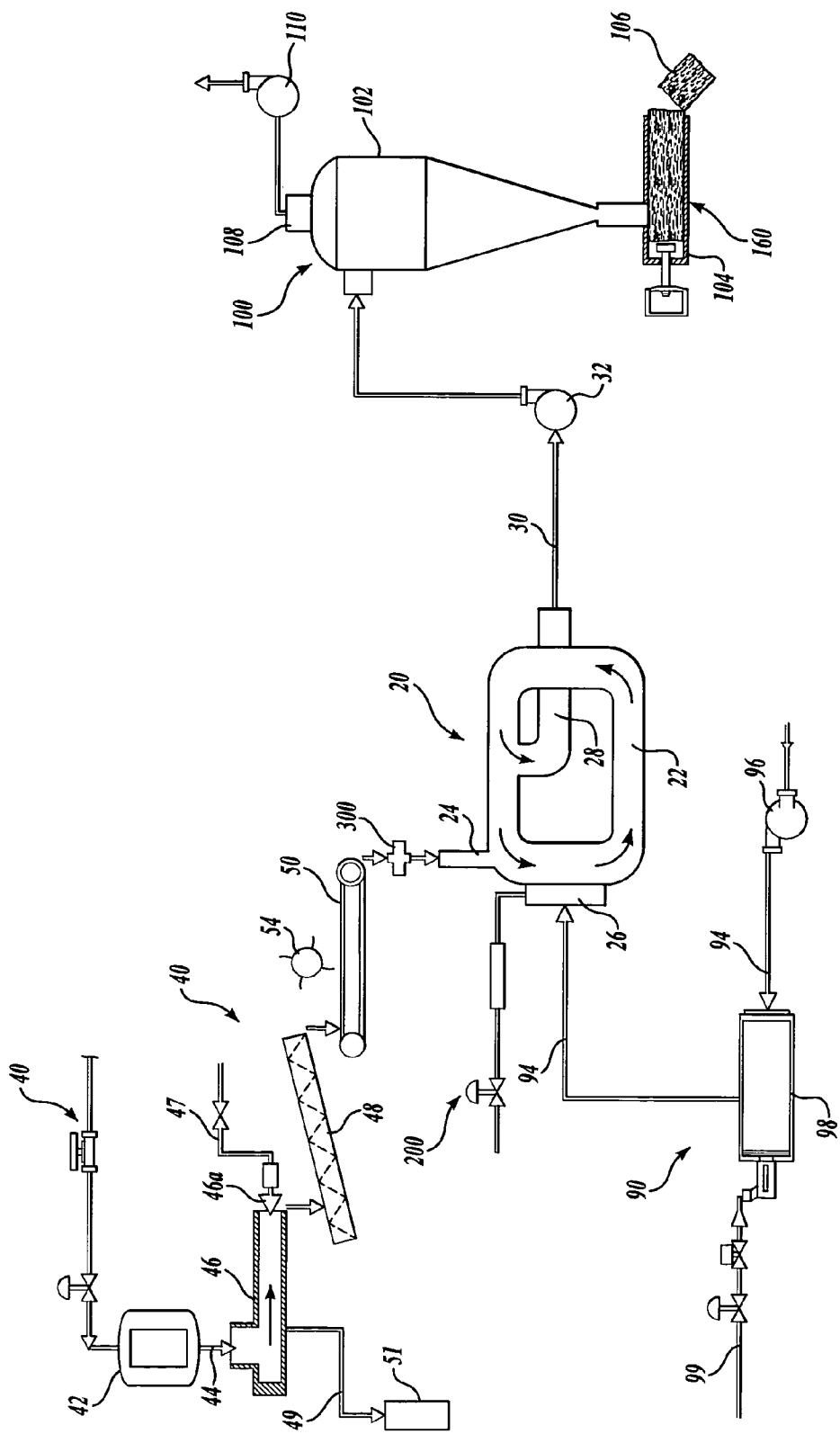
FIG. 1 is a schematic diagram of a drying system constructed in accordance with the present invention suitable for carrying out the process in the present invention.

The present invention comprises a drying system having a jet dryer designed to dry wet pulp directly from a pulp mill to a singulated fiber product. Referring to FIG. 1, a drying system constructed in accordance with the present invention includes a jet dryer 20, a pulp supply system 40, a heated air supply system 90, a fiber separation system 100, a fiber collection system 160, and a steam injection system 200.

The jet dryer 20 includes a conduit 22, a pulp intake 24, an air and steam manifold 26, and a fiber outlet 28. It will be understood that, as used herein, the term "jet dryer" means any device that accelerates air into the conduit 22, enabling the simultaneous drying and singulation of a substance flowing though the conduit 22. The pulp intake 24 is coupled to the conduit 22 for delivering feed pulp to the conduit 22. The manifold 26 is coupled to the jet dryer conduit 22 to deliver feed air via air feed conduit 94 into the manifold 26, which introduces the air into the conduit 22 through a series of nozzles that are directed to induce flow within the conduit 22. The fiber outlet 28 is coupled to the conduit 22 to provide an outlet for outlet air, fibers, and fines from conduit 22.

The conduit 22 is arranged in a closed loop. The loop conduit 22 can take various shapes, such as circular, oval, elongated rectangular, a "D" shape, square, or other similar shape. Without being bound by theory, it is believed that when wet fibers enter the conduit 22 loop, a centrifugal separation takes place so that wetter/denser fibers are recirculated along the outer edge of the loop while drier/less dense fibers move towards the inner part of the loop. Air and dried product exit from a fiber outlet 28 placed along the inner part of the loop. One suitable jet dryer 20 for use in the present invention is a Fluid Energy Aljet Model 4 Thermajet, X0870L, manufactured by Fluid Energy Processing & Equipment Company.

The jet dryer 20 further includes an outlet flow conduit 30 coupled to the jet dryer 20 fiber outlet 28 and associated with the fiber separating system 100. The outlet flow conduit 30 delivers outlet air, fibers, and fines flow to the fiber separating system 100. The outlet flow conduit includes a balance fan 32. The balance fan 32 controls the null pressure in the jet dryer where the inlet conduit 24 connects to loop conduit 22. It is desirable to prevent the fibers and fines from settling out of the outlet air in outlet conduit 30. If fibers and fines settle out of the outlet air, the fibers have an increased tendency to knot.

Pulp is fed into a head tank 42 from the pulp supply system 40. The head tank is coupled via conduit 44 to a dewatering device 46. The head tank 42 receives supply pulp directly from the pulping stage of a pulp mill and supplies it to the dewatering device 46. As shown in FIG. 1, the dewatering device 46 may be a screw press of conventional design. The dewatering device 46 partially dewaters the supply pulp from head tank 42 and delivers dewatered feed pulp to a shaftless screw conveyor 48 which in turn delivers the pulp to a conventional conveyor 50. The conveyor 50 drops the pulp into a flaker 300, which will be described in more detail below. A rotary doctor 54 can be employed to more evenly distribute the fibers before they are fed into the inlet conduit of the jet dryer. Pressurized air is supplied via conduit 47 to the outlet end 46a of the screw press 46. The air is used to load an axially adjustable cone integral with the screw press outlet for the purpose of removing more or less water from the pulp. Pressate from the screw press 46 exits the screw press via conduit 49, which delivers it to a drain 51.

The shaftless screw conveyor 48 can be of conventional design, for example, one manufactured by Martin Sprocet and Gear, Inc., Martin Conveyor Division. The shaftless screw conveyor has a shaftless screw that feeds wet pulp at an incline toward the conveyor 50. The shaftless screw conveyor drops the pulp at the end feed end of the conventional conveyor 50. The dewatering device 46 may be selected from a variety of devices such as a screw press, belt press, continuous centrifuge, batch centrifuge, twin roll press, or other similar device.

Figure 1A:
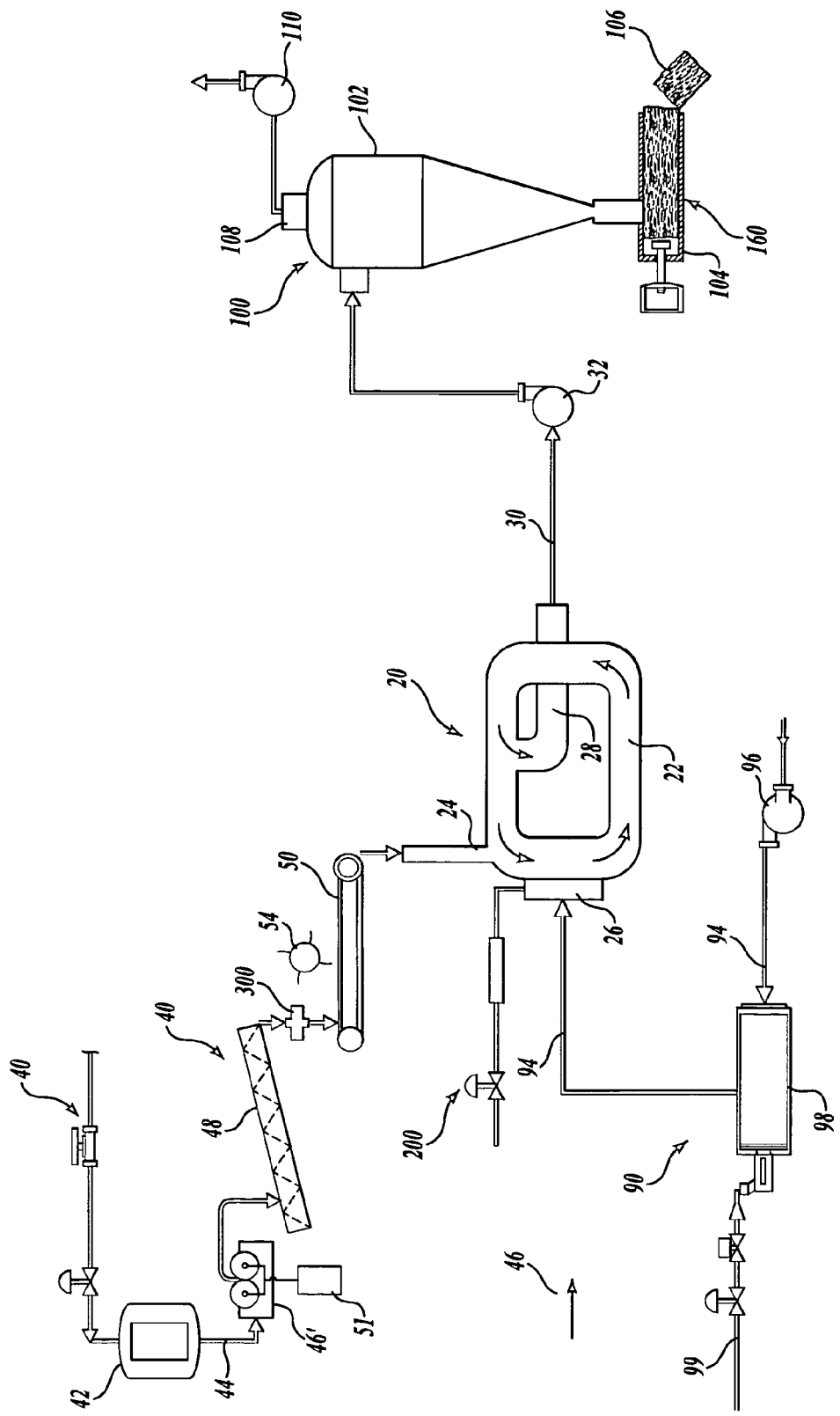
FIG. 1A is a schematic diagram of an alternate pulp feed system.

It has been found that the screw press may contribute to knots in the final product. This impact can be mitigated by the addition of a conventional debonder to the pulp before it is dewatered in the screw press. Referring to FIG. 1A, an alternate arrangement for dewatering the pulp and delivering it to the jet dryer is shown. In this embodiment the pulp is preferably delivered to a twin roll press 46' instead of a screw press. The pulp is delivered to the side of the twin roll press. Pulp is dewatered as it is drawn upwardly between the perforated rolls, is separated from the rolls, and delivered to the shaftless screw conveyor 48. Pressate is taken from inside the rolls and delivered to drain 51. In this embodiment the pulp is then delivered to the flaker 300, which deposits the pulp on conveyor 50. The doctor 54 is positioned over the conveyor 50, which in turn delivers the pulp directly to the inlet conduit 24 of the jet dryer 20. While the shaftless screw conveyor is shown in this embodiment, it may be preferable to omit it and deliver the pulp directly from the twin roll press 46' to the flaker 300.

The supply pulp from pulp supply source 42 will typically have a high fluid content, having a 0.01% to 10% consistency, and more typically a 3% to 10% consistency. The preferred supply pulp is a never-dried pulp. The supply pulp may be bleached pulp, unbleached pulp, mechanical pulp, chemical pulp, a dissolving grade pulp, or any other suitable pulp. Although not preferred, the pulp may also be a once-dried and reslurried pulp. In the present invention, much of this fluid may be removed by the dewatering device 46 or 46'. Typically, the dewatering device 46 or 46' removes a portion of the fluid from the supply pulp and increases the consistency of the feed pulp to 10% to 55%, prior to drying the feed pulp by the jet dryer 20. Preferably, the consistency of the feed pulp is 20% to 50% and, most preferably, from 30% to 40%.

A treatment substance may be incorporated into the feed pulp at any convenient location in the system. The treatment substance may be supplied to the head tank 42, the dewatering device 46 or 46', the conveyors 48 and 50, the flaker 300, the jet dryer or in the conduit between the jet dryer and the separation system. The treatment may be delivered with any apparatus known in the art. For instance, the treatment substance may be delivered in a conduit, spray system, mixing device, or other device or combination of devices. Where the supply pulp is a pressed wet web, the treatment substance may be applied to the supply pulp by a spray system, roller coating system, or a combination of spray system and roller coating system.

The treatment substances may include, but are not limited to, surfactants, debonders, crosslinkers, hydrophobic materials, mineral particulates, superplasticizer, foams, dyes, other materials for specific end-use fiber properties, and combinations of treatment substances. The term surfactant includes, but is not limited to, oil in water emulsions; surfactants disclosed in U.S. Pat. No. 6,436,231, to Graef et al.; U.S. Pat. No. 6,074,524, to Wu et al.; U.S. Pat. No. 6,159,335, to Owens et al.; and Canadian Patent No. 947,915, to Angel et al., all of which are expressly incorporated herein by reference. Surfactants impart desirable properties to pulp fibers, such as reducing fiber to fiber bonding, improving absorbency or reducing friction of finished webs. Surfactants are used in tissue and towel manufacturing, and are used extensively in the textile industry for numerous enhancements. The classes of surfactants include anionic, cationic, nonionic, or ampholytic/zwitterionic surface active materials. Examples of anionic surfactants include sodium stearate, sodium oleate, sodium dodecyl sulfate, sodium dodecyl benzene sulfonate, polyether sulfate, phosphate, polyether ester, and sulfosuccinate. Examples of cationic surfactants include dodecylamine hydrochloride, hexadecyltrimethyl ammonium bromide, cetyltrimethyl-ammonium bromide, and cetylpyridinium bromide. One class of surfactant is cationic surfactants based on quaternary ammonium compounds containing fatty type groups. Examples of nonionic surfactants include polyethylene oxides, sorbitan esters, polyoxyethylene sorbitan esters, and alkylaryl polyether alcohols. An example of ampholytic or zwitterionic surfactant is dodecyl betaine. Examples of commercial surfactant are EKA Chemicals Inc. Berolcell 587K, which is a cationic surface active agent, and Process Chemicals, LLC, Softener CWW, which is a cationic surfactant used as a yarn lubricant. A useful debonder based on imidazolinium methosulfate is available under the trade name Arosurf PA777 from Goldsmidt Chemical Corporation. Any one of a number of crosslinking agents and crosslinking catalysts, if necessary, can be used to provide crosslinked fibers. The following is a representative list of useful crosslinking agents and catalysts. Suitable urea-based crosslinking agents include substituted ureas such as methylolated ureas, methylolated cyclic ureas, methylolated lower alkyl cyclic ureas, methylolated dihydroxy cyclic ureas, dihydroxy cyclic ureas, and lower alkyl substituted cyclic ureas. Specific urea-based crosslinking agents include dimethyldihydroxy urea (DMDHU, 1,3-dimethyl-4,5-dihydroxy-2-imidazolidinone), dimethyloldihydroxyethylene urea (DMDHEU, 1,3-dihydroxymethyl-4,5-dihydroxy-2-imidazolidinone), dimethylol urea (DMU, bis[N-hydroxymethyl]urea), dihydroxyethylene urea (DHEU, 4,5-dihydroxy-2-imidazolidinone), dimethylolethylene urea (DMEU, 1,3-dihydroxymethyl-2-imidazolidinone), and dimethyldihydroxyethylene urea (DMeDHEU or DDI, 4,5-dihydroxy-1,3-dimethyl-2-imidazolidinone).

Suitable crosslinking agents include dialdehydes such as $C_2$-$C_8$ dialdehydes (e.g., glyoxal), $C_2$-$C_8$ dialdehyde acid analogs having at least one aldehyde group, and oligomers of these aldehyde and dialdehyde acid analogs, as described in U.S. Pat. Nos. 4,822,453; 4,888,093; 4,889,595; 4,889,596; 4,889,597; and 4,898,642. Other suitable dialdehyde crosslinking agents include those described in U.S. Pat. Nos. 4,853,086; 4,900,324; and 5,843,061.

Other suitable crosslinking agents include aldehyde and urea-based formaldehyde addition products. See, for example, U.S. Pat. Nos. 3,224,926; 3,241,533; 3,932,209; 4,035,147; 3,756,913; 4,689,118; 4,822,453; 3,440,135; 4,935,022; 3,819,470; and 3,658,613.

Suitable crosslinking agents include glyoxal adducts of ureas, for example, U.S. Pat. No. 4,968,774, and glyoxal/cyclic urea adducts as described in U.S. Pat. Nos. 4,285,690; 4,332,586; 4,396,391; 4,455,416; and 4,505,712.

Other suitable crosslinking agents include carboxylic acid crosslinking agents such as polycarboxylic acids. Polycarboxylic acid crosslinking agents (e.g., citric acid, propane tricarboxylic acid, and butane tetracarboxylic acid) and catalysts are described in U.S. Pat. Nos. 3,526,048; 4,820,307; 4,936,865; 4,975,209; and 5,221,285. The use of $C_2$-$C_9$ polycarboxylic acids that contain at least three carboxyl groups (e.g., citric acid and oxydisuccinic acid) as crosslinking agents is described in U.S. Pat. Nos. 5,137,537; 5,183,707; 5,190,563; 5,562,740, and 5,873,979.

Polymeric polycarboxylic acids are also suitable crosslinking agents. Suitable polymeric polycarboxylic acid crosslinking agents are described in U.S. Pat. Nos. 4,391,878; 4,420,368; 4,431,481; 5,049,235; 5,160,789; 5,442,899; 5,698,074; 5,496,476; 5,496,477; 5,728,771; 5,705,475; and 5,981,739. Polyacrylic acid and related copolymers as crosslinking agents are described U.S. Pat. Nos. 5,549,791 and 5,998,511. Polymaleic acid crosslinking agents are described in U.S. Pat. No. 5,998,511.

Specific suitable polycarboxylic acid crosslinking agents include citric acid, tartaric acid, malic acid, succinic acid, glutaric acid, citraconic acid, itaconic acid, tartrate monosuccinic acid, maleic acid, polyacrylic acid, polymethacrylic acid, polymaleic acid, polymethylvinylether-co-maleate copolymer, polymethylvinylether-co-itaconate copolymer, copolymers of acrylic acid, and copolymers of maleic acid.

Other suitable crosslinking agents are described in U.S. Pat. Nos. 5,225,047; 5,366,591; 5,556,976; and 5,536,369.

Suitable catalysts can include acidic salts, such as ammonium chloride, ammonium sulfate, aluminum chloride, magnesium chloride, magnesium nitrate, and alkali metal salts of phosphorous-containing acids. In one embodiment, the crosslinking catalyst is sodium hypophosphite.

Mixtures or blends of crosslinking agents and catalysts can also be used.

The crosslinking agent is applied to the cellulosic fibers in an amount sufficient to effect intrafiber crosslinking. The amount applied to the cellulosic fibers can be from about 1 to about 10 percent by weight based on the total weight of fibers. In one embodiment, crosslinking agent in an amount from about 4 to about 6 percent by weight based on the total weight of fibers.

The term hydrophobic material includes, but is not limited to, latex, sizing agents used to treat pulp such as alkyl ketene dimer or alkenyl succinic anhydride, waxes, oils, or other chemicals that react with the fiber and render the surface hydrophobic. The term mineral particulate includes, but is not limited to, clay, calcinated clay, calcium carbonate, calcium sulfate, zinc oxide, talc, titanium dioxide, silicas, fly ash, sodium aluminosilicates, gypsum, or other minerals. The term superplasticizer includes, but is not limited to, linear polymers that contain sulfonic acid groups, modified lignosulfonates, sulfonated melamine-formaldehyde condensates, sulfonated naphthalene-formaldehyde condensates, and polycarboxylate derivatives. An example of a commercial superplasticizer includes Boral Materials Technology Boral SP, a sulfonated naphthalene-formaldehyde condensate. The term foam includes, but is not limited to, foaming agents, foamed material, and foams disclosed in U.S. Pat. No. 6,518,479, to Graef et al., which is expressly incorporated herein by reference. Flame retardant chemicals such as boric acid may also be added.

More than one treatment substance may be delivered to the pulp. The treatment substances may also be delivered in any number of steps or stages. For instance, the treatment substance may include binder molecules and particles, where the binder molecules are first applied to the fibers and then the particles are added to the binder molecule-coated fibers, thus binding the particles to the fibers (as disclosed in U.S. Pat. No. 5,641,561, to Hansen et al.). Other fiber treatment substances and methods known in the art may be used without departing from the present invention.

In addition to the embodiment described above, the pulp supply system 40 may be adapted so that the water contained in the pulp supply source 42 is exchanged for a solvent treatment substance. The term solvent includes, but is not limited to, alcohols, ketones, ethers, alkanes, aromatics, aldehydes, or other classes of organic materials. The solvent used may be recovered at the fiber separation system 100.

Additional treatment substances may be added to cause an in situ precipitation. When in situ precipitation is desirable, a first mineral treatment substance is added to the pulp, then a second treatment substance is added to the pulp. The first and second treatment substances react to form a precipitate treatment substance. For example, dissolved calcium hydroxide may be used as the first treatment substance, and dissolved sodium bicarbonate may be used as the second treatment substance. The calcium hydroxide and sodium bicarbonate react to precipitate calcium carbonate. Other precipitate treatment substances may be formed for treating the pulp including, but not limited to, calcium aluminum silicates, calcium aluminum carbonates, calcium aluminum phosphates, or other mineral precipitates.

Figure 2:
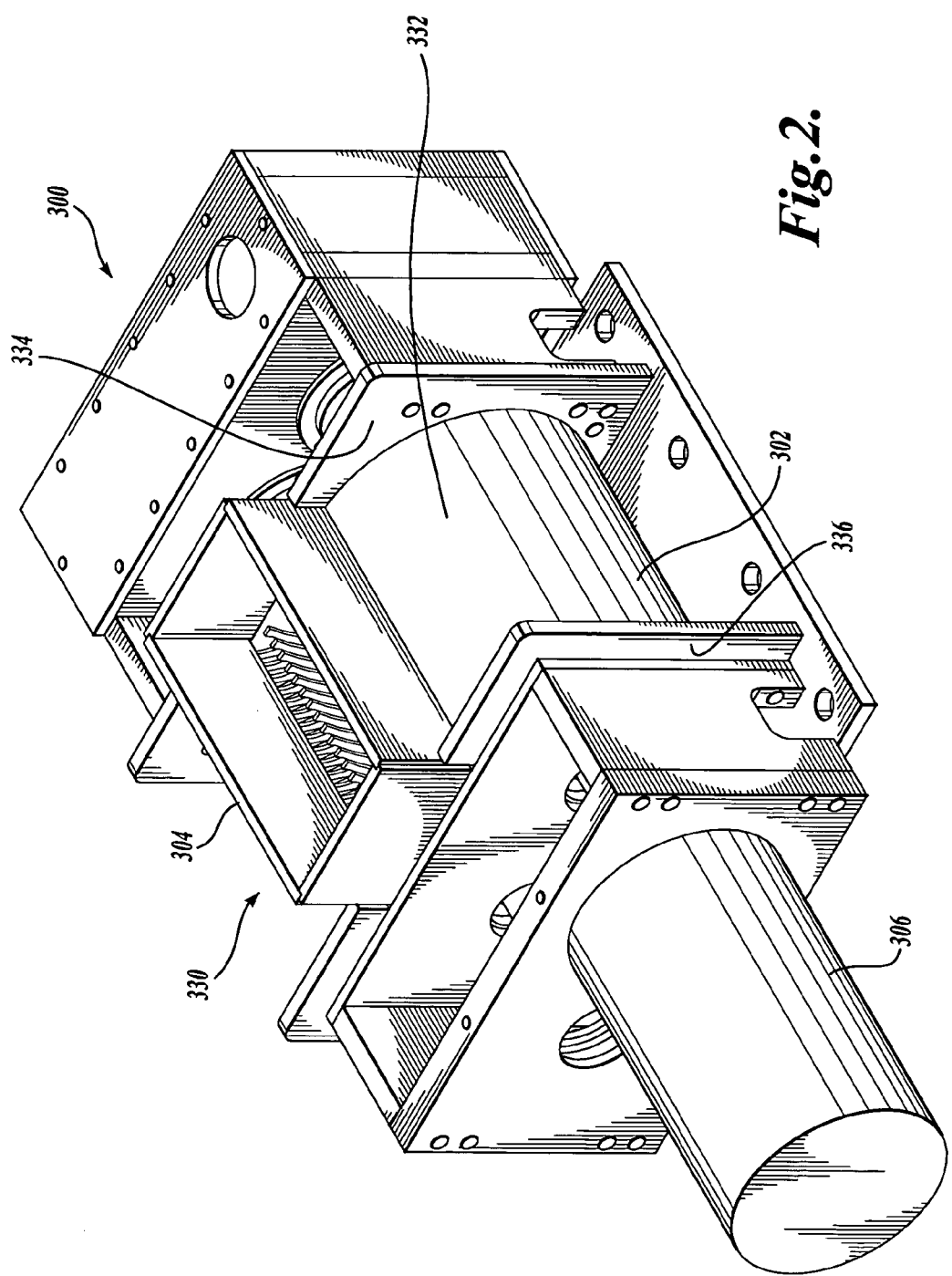
FIG. 2 is a schematic view of the flaker used with the present invention.

Referring now to FIG. 2, one embodiment of a pulp flaker 300 according to the present invention is illustrated. The pulp flaker 300 includes a housing 302, which is designed to be in close tolerance with the rotors housed within. The housing 302 comprises two semicircular housing members 330, 332 spaced from each other to provide openings for an inlet and an outlet at top and bottom positions, respectively. It is to be appreciated that the use of directional language in this application, such as top, bottom, upper, lower, left, right, horizontal, and vertical, is with respect to the figures. In practice, the apparatus may be oriented differently from the orientations shown to the figures. Cover plates 334, 336 are placed on either side of the semicircular housing members. The cover plates may be provided with the necessary openings for rotor shafts, supporting bearings, drivers, gears, and/or one or more driver shafts. Further additional supporting structure may be added to the pulp faker as required by the pulp flaker's location or placement. Rotors (minimally visible in FIG. 2) are assemblies comprising at least a shaft and a plurality of fingers fixed to the shaft. The pulp flaker 300 includes an inlet box 304 coupled with an opening in the housing to allow pulp to fall on the rotating rotors inside. The inlet box 304 is located at a central location to direct the pulp to the rotors. A chute (not shown) can be provided as a transition piece between the belt conveyor 50 and the pulp flaker inlet box. An outlet (338 in FIG. 3) is located on the underside of the pulp flaker 300 and coupled to an opening in the housing to allow the pulp to be discharged from the housing to any downstream equipment.

The pulp flaker 300 includes a driver 306. The driver shaft (not shown) is coupled directly or indirectly through gears to at least one rotor within housing 302. A second rotor can be coupled to an independent driver, or alternatively can be coupled to the same driver 306 with or without a reduction or increase in gear ratio. First and second rotors are configured to rotate at a specified speed differential, and in opposite directions. Opposite directions means that one rotor turns clockwise and one rotor turns counterclockwise. At least one rotor is configured to rotate at a speed from about 500 rpm to about 3600 rpm. This rotor is referred to as the "full speed rotor." The speed of the full speed rotor is dependent on the type of pulp, shape and size of pulp bundles, and processing times. The second rotor is configured to operate at a reduced ratio that is one-tenth to nine-tenths the speed of the full-speed rotor. The rotor that operates at a reduced speed is referred to as the "off-speed rotor." The off-speed rotor may additionally function to clean the full-speed rotor to allow uniform feed throughput. In one embodiment, the preferred speed of rotation for the second or off-speed rotor is about one-third the speed of the full-speed rotor. It is theorized that rotors operating at about a 3 to 1 speed ratio optimally produce the pulp in the desired flake size range suitable for a dryer, such as a jet dryer. It should be noted that in a commercial application multiple flakers may be ganged or grouped together or single larger units may be manufactured that will function similarly to multiple ganged or grouped flakers.

Figure 3:
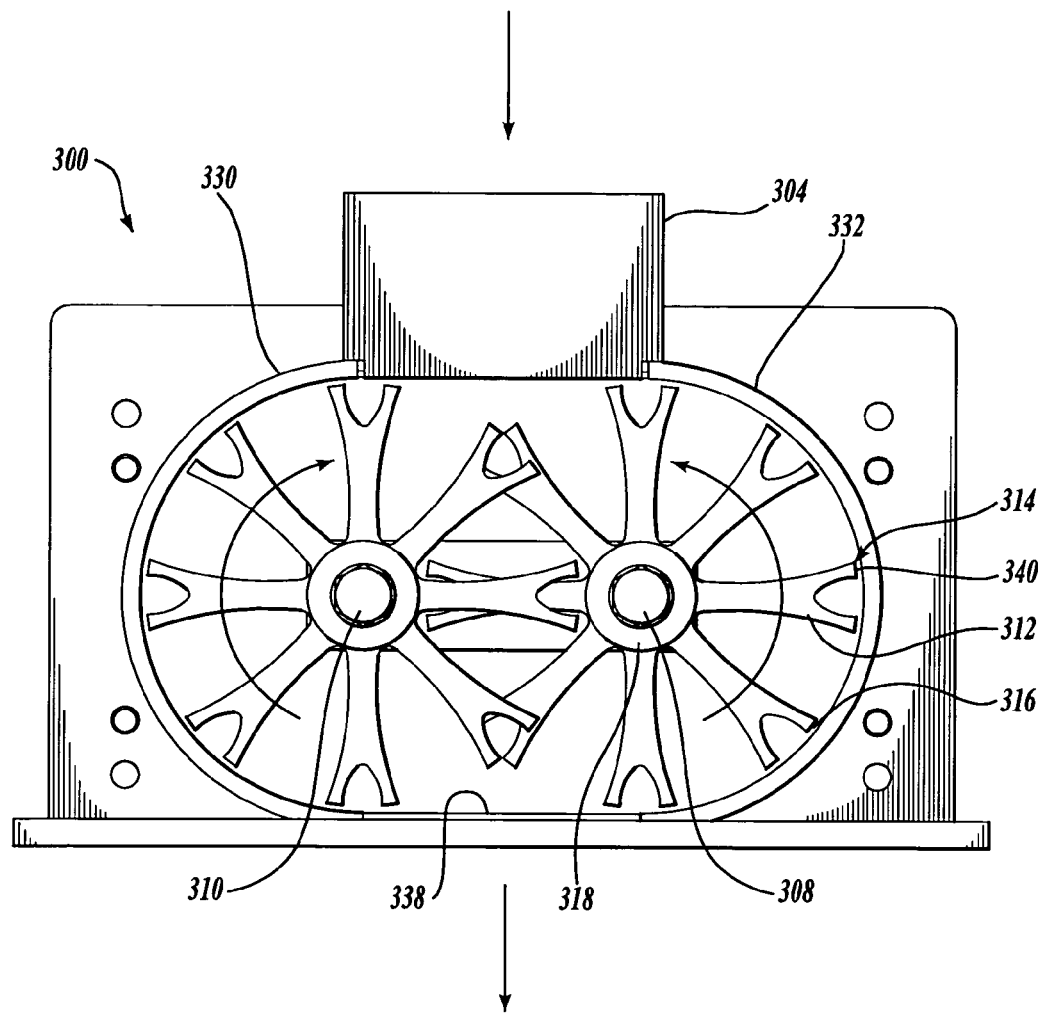
FIG. 3 is a cross-sectional view of the flaker of FIG. 2.

Referring now to FIG. 3, a cross-sectional illustration of the pulp flaker 300 with one cover plate removed clearly shows first and second rotor relationship, 308 and 310 respectively, and the semicircular housing members 330 and 332 that enclose them.

As shown in FIG. 3, rotor 308 and rotor 310 include a plurality of fingers 312, attached to the respective shafts of rotors. The fingers on each of the rotors are uniformly distributed circumferentially around the perimeter of the rotor shaft. For ease of manufacture, a flat plate can be used to produce each set of eight fingers. Spacers integral with the rotors, or as separate components, provide a finger-to-finger space between adjacent sets of fingers. The space between fingers allows the fingers of the opposing rotor to pass in the space with a desired clearance on either side. The number of sets of fingers on any one shaft can be varied according to the design and/or capacity of the pulp flaker. Sets of fingers on any one rotor may be fixed at the same angle on the rotor or each set may be offset at an angle from the adjacent sets. When the two assembled rotors are mounted within the housing, an alternating pattern of fingers is produced, whereby fingers on one rotor are interspaced with the fingers on the second rotor. The interspaced finger configuration is more clearly shown in FIGS. 4 and 5.

Various configurations of fingers are possible. Finger configuration is designed to impact the pulp in a manner to produce flakes in the desired size range. Fingers on both rotors include at least one leading edge 314, whereby upon rotation the leading edge passes in close proximity to the inner surface of one of the semicircular housing members 330 and 332. The clearance distance 316 between the leading edge of fingers and the semicircular housing is designed to produce pulp in the particulate size desired, typically in the range of about one-sixteenth of an inch to about one-half of an inch, on average. The leading edge 314 of fingers 312 is not spaced so far apart from the semicircular housing, so as to merely roll or push the pulp around the housing without significant breaking up of the pulp. In one embodiment, the clearance distance 316 between the leading edge 314 and the housing is about one-eighth of an inch or less.

In one embodiment of a pulp flaker finger 312, the finger is symmetrical with respect to an axis line extending along a radius line from the rotor center. Two leading edges are provided on each finger on either side of the axis line. A space is provided between the leading edges. The effect of this design is to double the number of impacts, while operating at a lower rpm. It is believed that increasing rpm beyond an upper limit will have a negative effect on the pulp. Too high an rpm will result in the pulp fiber integrity being compromised. At the same time, the rpm of the full-speed rotor is not so low so as to cause unacceptably large pulp particles leaving the flaker. The rpm of the full-speed rotor is from about 500 rpm to about 3600 rpm.

Figure 6:
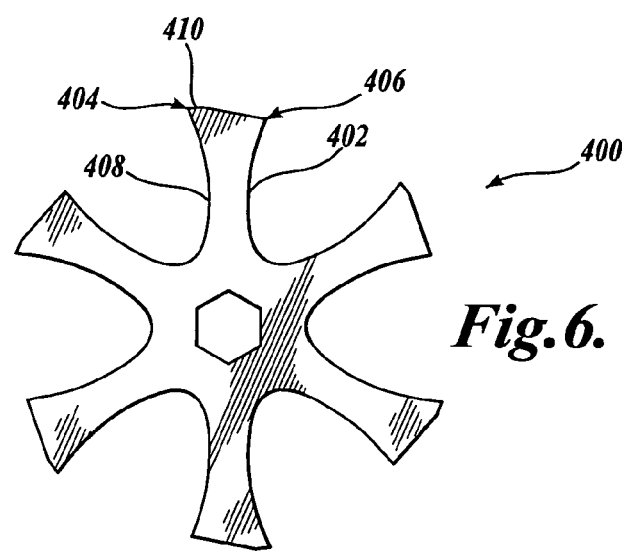

An alternative design for a pulp flaker finger plate 400 is illustrated in FIG. 6. In this embodiment, there are 6 fingers compared to the 8 fingers of the embodiment shown in FIG. 3. Furthermore, each of the fingers 402 has a single leading edge 404. The finger has a trailing edge 406 that has a greater clearance distance as it passes by the semicircular housing portion. It is believed the reduction in clearance distance at the trailing edge will avoid the effect of rolling and/or pushing the pulp along the housing without significant breakdown. Another feature of the pulp flaker finger of FIG. 6 is the curved "scoop" design 408 of the finger edge heading in the direction of rotation. The scoop design is intended to scoop up the pulp in the spaces between fingers and fling the pulp towards the outer edges, where the leading edges will impact with the pulp.

Referring back to FIG. 3, as the rotors 308 and 310 rotate in opposite directions, as indicated by the curved arrows, the leading edges of fingers of one rotor will pass nearest to the opposite rotor when the fingers are slightly at an angle before being horizontal. This is because the leading edges are offset from the center axis on each finger. As the rotors rotate, the fingers of one rotor pass interspaced between the fingers of the opposite rotor in the region between rotors. The clearance distance (320 in FIG. 5) between the leading edge of the fingers of one rotor and the opposite rotor can be about the same as the distance between the leading edge of the fingers and the semicircular part of the housing. In one embodiment, the distance from the leading edge when the fingers pass the nearest point to the opposing rotor (i.e., the fingers pass by the spacers of the opposing rotor) is approximately one-eighth of an inch or less. Note that the leading edges are at the nearest point to the opposing rotor immediately before the finger reaches the horizontal position, when the longitudinal axis of the finger is in the line defined by the center points of the rotors.

Figure 4:
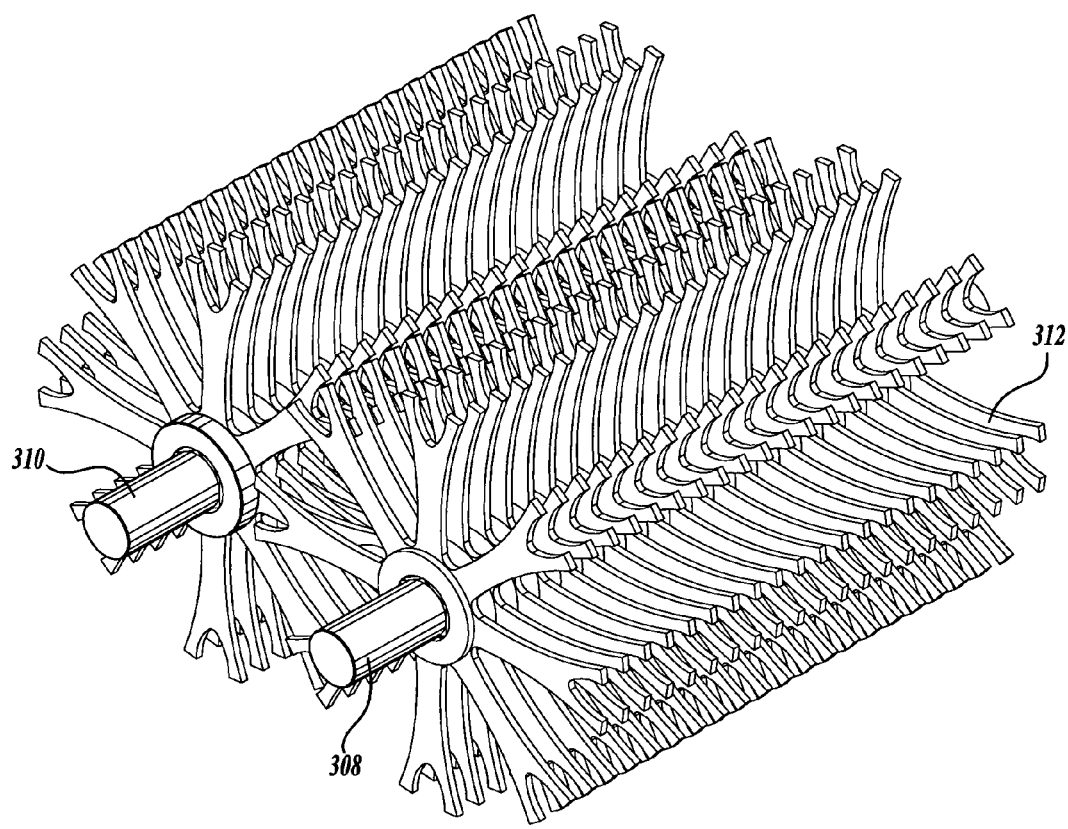
FIG. 4 is an isometric view of the rotors employed in the flaker of FIG. 2.

Referring now to FIG. 4, the two rotors 308, 310 are shown in isolation from the housing, thus showing the fingers both circumferentially and longitudinally arranged on each rotor. The intermeshing of the fingers of one rotor with the fingers of the opposing rotor as the fingers pass one another in the region between rotors is clearly apparent. The pulp feed is deposited from above in the region between rotors. The pulp is immediately diminished in size in the section between rotors, where the fingers of one rotor pass in close proximity to the fingers of the second rotor.

The longitudinal distance (324 in FIG. 5) between the fingers of one rotor and the adjacent fingers of the opposite rotor, on either side, is about the same as the distance 320 between any leading edge as it passes the nearest point of the opposing rotor. The distance is also approximately the same distance as the clearance distance 316 between the leading edge and the semicircular portion of the housing. In one embodiment, the longitudinal distance between one finger of one rotor and the adjacent finger of the opposing rotor is approximately one-eighth of an inch or less. Three distances affecting finger design, and consequently pulp size, have been described. These three distances are: the longitudinal distance between the finger of one rotor and the adjacent finger of the opposite rotor as the fingers pass interspaced between the region between rotors (finger to finger distance), the distance between the leading edge of a finger as it passes to the nearest point of the opposing rotor (finger to rotor distance), and the distance of the leading edge of a finger to the semicircular portion of the housing (finger to housing distance). In one embodiment, the three distances are approximately the same to one another, the distance being approximately one-eighth of an inch or less. However, it is to be appreciated from a reading of this disclosure, each of the distances can be independently different to each other.

The selected clearance distance between the leading edges and the opposing rotor, the clearance distance between the fingers as they pass one another, and the clearance distance between the fingers as they pass the semicircular housing portion enable the pulp to be processed by the flaker without damaging cellulose fibers or jamming the flaker. Additionally, the ends of the fingers have a flat spot 340 of specific width, the width being perpendicular to a radius line from the rotor. The pulp flaker finger embodiment of FIG. 6 also includes a flat spot 410. It is believed that the flat spots of the fingers reduce the amount of material that gets pushed around the housing and also reduces the wear on the fingers.

Figure 5:
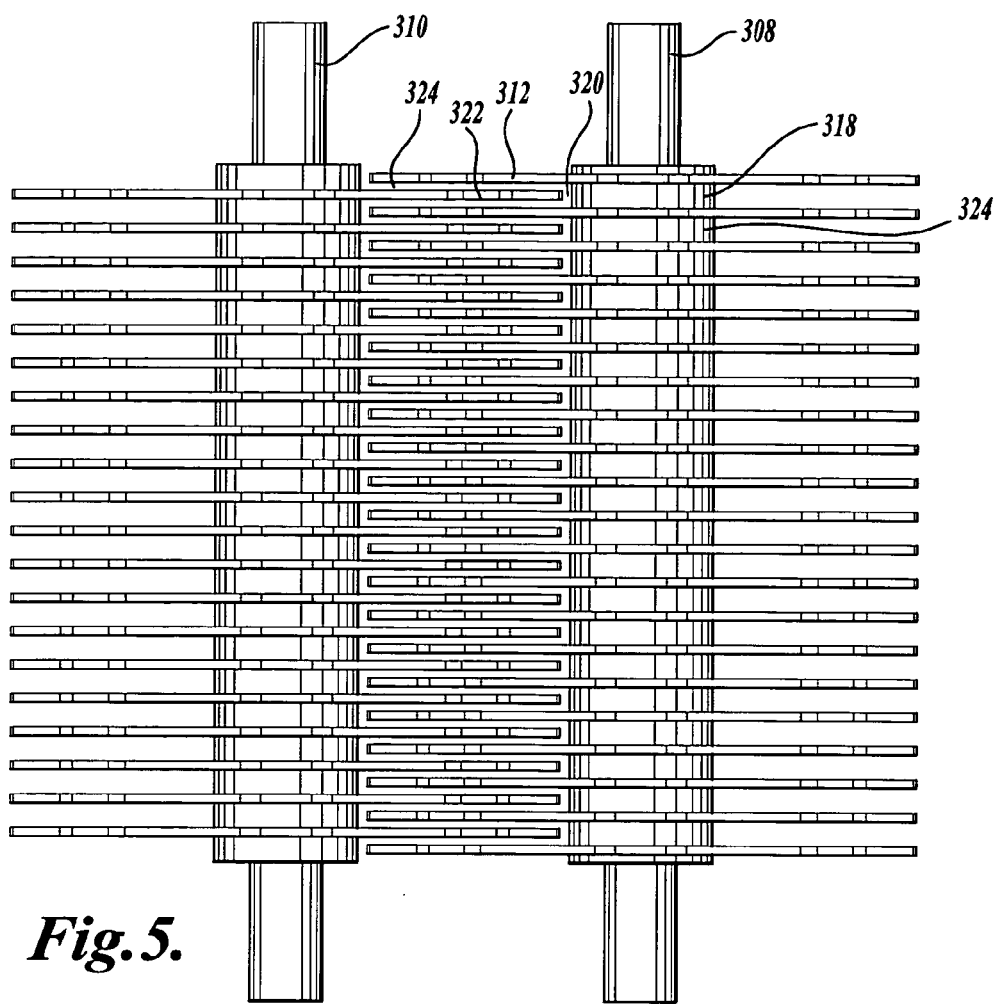
FIG. 5 and FIG. 6 are plan and side views of the rotors shown in FIG. 4.

Referring now to FIG. 5, the top view of the rotors 308 and 310 shown in FIG. 3 is illustrated. As can be seen in FIG. 5, the section between rotors 308 and 310 is configured to close tolerances to produce the required pulp size reduction. Not only is there a close tolerance distance between the leading edges and the housing, but there is also a close tolerance distance 324 between alternating fingers 312 of rotor 308 and fingers 322 of rotor 310. The clearance distance 320 between the leading edge of fingers of rotor 310 to the opposing spacer 318 on rotor 308 is visible, as is the clearance distance 324 between the fingers of rotor 310 and the fingers of rotor 308. As can be seen, the pulp entering the pulp flaker from above the rotating fingers is subjected to efficient impacting and shearing forces to reduce the incoming pulp size to a substantially uniform size in the range of about one-sixteenth to about one-half of an inch, or less, on average.

Figure 7:
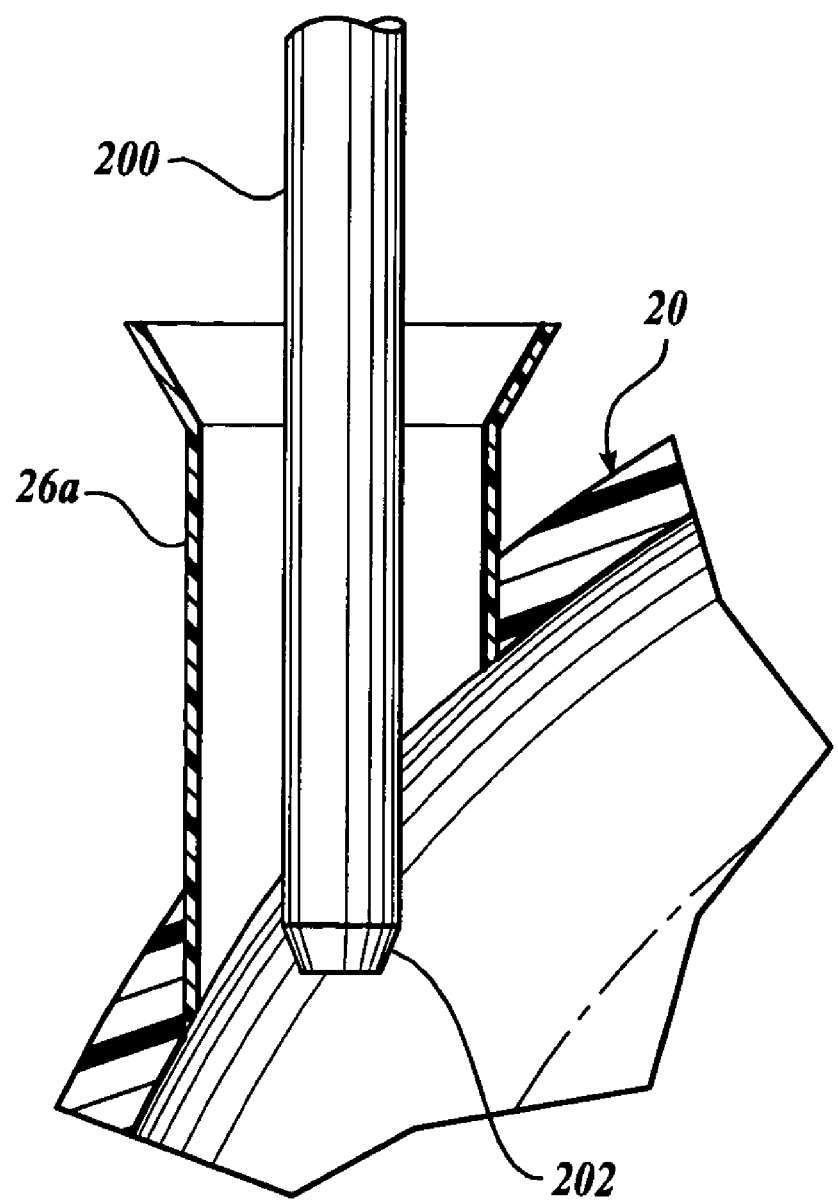
FIG. 7 is a schematic of steam and air inlet utilized with the jet dryer of the present invention.

Referring to FIG. 7, the jet dryer is modified to include a steam injection nozzle 200. The steam injection nozzle 200 comprises a relatively small pipe having a nozzle 202 for injecting steam into the interior of the jet dryer 20. The pipe 200 is positioned concentrically within an air injection port 26a. The interior diameter of the air injection port 26a was adjusted so that it allows the same air flow as if the steam injection pipe 200 were not positioned therein. Steam is supplied to the steam pipe 200 from conventional steam sources such as those commonly available in most industrial plants. Steam may be supplied at any desired pressure; however, it is preferably supplied to the nozzle(s) at a pressure of between 344 KPa (50 psig) and 4,137 KPa (600 psig), more preferably from 688 KPa (100 psig) to 2,758 KPa (400 psig), and most preferably from 896 KPa (130 psig) to 2,068 KPa (300 psig). The size of the orifice in nozzle 202 can be varied depending on the size of the dryer and, more particularly, depending on the size of the conduit 22. Two sizes of dryers have been used effectively in accordance with the present invention. A laboratory size dryer having a 10.16 cm (4 in) diameter conduit has employed steam orifice sizes ranging from 1.5 mm (0.059 in) to 6.5 mm (0.26 in). A pilot plant dryer having a 25.4 cm (10 in) diameter conduit may have a steam orifice size ranging from 6.4 mm (¼ in) to 38 mm (1½ in).

Referring again to FIGS. 1 and 1A, the air supply system 90 may include an air pump 96 and an air heater 98. The air pump 96 receives supply air via an air supply source and is coupled in flow communication with air feed conduit 94. The air heater 98 heats the air in an air feed conduit prior to its introduction into the manifold 26.

The air pump 96 may be a positive displacement high volume air pump that delivers the supply air at a positive air pressure and at a fixed volume to the air heater 98. One suitable air pump 96 for use with a jet dryer having a 10.16 cm (4 in) diameter conduit is a Roots-Dresser universal rotary lobe blower system (Model No. 45URAI) with an inlet silencer, a discharge silencer type conventional filtration, and electric 15 hp drive motor. The air pump 96 may have a gauge range of 0 KPa to 103.5 KPa (15 psig). A suitable air pump 96 for use with the pilot plant jet dryer having a 25.4 cm (10 in) conduit is a centrifugal blower with inlet and outlet silencers, filtration and a 44.7 Kw (60 hp) electric motor. The manifold air pressure may be varied from 1.4 KPa (2 psig) up to 103.5 KPa (15 psig). It has been found that manifold pressures on the order of 20.7 KPa (3 psig) to 34.5 KPa (5 psig) yield a dried pulp having higher permeability and lower sonic knots than pulp dried at lower manifold pressures. Increasing the manifold as high as 67 KPa to 103.5 KPa (10-15 psig) may produce a product with usefully higher permeability and lower sonic knots. In one embodiment, it has been found that knots can be significantly reduced by raising the manifold pressure alone to 20.7 Kpa (3 psig) to 103.5 KPa (15 psig), and more preferably from 20.7 KPa (3 psig) to 34.5 KPa (15 psig).

The air heater 98 heats the supply air. The supply air is delivered to the manifold 26 of the jet dryer 20 through conduit 94. The manifold 26 preferably feeds the feed air tangentially into the jet dryer 20 conduit 22 loop for the purpose of creating turbulence for singulating and drying the feed pulp inside the jet dryer 20.

The air heater 98 may be a flow-through type heater that is controlled to regulate the air temperature supplied to the jet dryer manifold 26. The air heater 98 may be an electric heater, a gas heater or any other suitable form of heater. One suitable air heater 98 for use with the laboratory jet dryer having a 10.16 cm (4 in) conduit is a Watlow Electric immersion heater, Model No. 706-96B 12459 using 480 VAC line voltage, and having a pressure rating of 1034.2 KPa (150 psig) at 565.5° C. (1,050° F.). Alternatively, the air heater 98 may be natural gas fired from natural gas source 99. A suitable heater for use with the pilot jet dryer having a 25.4 cm (10 in) conduit is a Gas Fired Air Heater, Tag No. 34-1004, available from Dayco Incorporated, Pottstown, Pa. The process air temperature is a process variable that has a direct effect on end product fiber appearance, end product fiber knot count, and fines content. It has been found that pulp flow rate through the jet dryer can be maximized by maintaining the air inlet temperature in the manifold in the range of 250° C. to 600° C., and more preferably from 300° C. to 400° C. It is preferred that the dryer outlet temperature be in the range of from 65° C. to 200° C.

Upon exiting the jet dryer 20, the outlet air, fibers, and fines may be transported along the outlet flow conduit 30 to be recovered by the fiber separation system 100. In this embodiment, a balance fan 32 receives dried and singulated fiber from the outlet conduit 30 and feeds it to a separation cyclone 102. The particulated fibers travel downwardly in this cyclone and are fed into a baler or compressor 104 where the fiber is compacted and then collected. Process air and fines are removed through the upper end 108 of the cyclone 102 and are drawn out and into a waste exhaust fan 110. The air from the fan 110, after being filtered to remove fine and other particulate, may be exhausted into the atmosphere. If there is sufficient residual heat, that heat can be recovered for further use in processing.

EXAMPLES

In the processing of pulp into dried, singulated fibers used in the examples below, several process conditions were evaluated. The effects of variations in the jet dryer inlet and outlet temperatures, feed rate, types of pulp, manifold pressures, and steam pressures at the nozzle were explored in the examples below.

Unless otherwise noted, the apparatus used for the examples below is as follows: pulp was dried and singulated into fibers using a Fluid Energy Aljet Model 10-34-1005 Thermajet, jet dryer. This dryer has a 25.4 cm (10 in) conduit. No modifications were made to the Thermajet dryer except for the steam injection system described above in conjunction with FIG. 7. Never-dried pulp was fed to the jet dryer as described in conjunction with FIG. 1.

The feed pulp had an initial consistency ranging from 3% to 4% in the head tank 42. The pulp was dewatered to a consistency ranging from 25% to 40% before it was fed to the flaker 300. Two types of furnish (feed pulp) were employed as set forth below. Sockeye is about 90% Douglas fir. Chinook is a mixture of spruce and pine.

The manifold pressure of the feed air and the steam pressure at the nozzle were varied to determine the effect on sonic knots and throughput. The operational parameters for several runs are set forth below.

The steam was fed through the injection nozzle as described above. The steam pressure was varied as noted below. Nozzle diameters of 9.5 mm (⅜") 11.1 mm (⁷⁄₁₆") 12.7 mm (½") 14.3 mm (⁹⁄₁₆") were used as noted below. The supply steam pressure was varied from 448 KPa (65 psi) to 1,379 KPa (200 psi).

In the examples below, "sonic knots" were tested by the following method for classifying dry fluffed pulp into three fractions based on screen mesh size. The first fraction is the knots and is defined as that material that is captured by a No. 5, 8 and 12 mesh screen. The second fraction is the accepts or the singulated fibers and is defined as that material that passes through a No. 12 mesh screen but is captured by a No. 60 mesh screen. The third fraction is of the fines and is defined as that material that passes through a No. 12 and through a No. 60 mesh screen captured by a 200 mesh screen. The separation is accomplished by sound waves at a frequency of 13 hz generated by a speaker. The sound waves are imposed upon a 5.0 gram pre-weighed sample of fluff pulp placed on a No. 5 mesh screen that is near the top of a separation column where the speaker sits at the very top. After a set period of time, usually six minutes, each fraction is removed from the separation column. The process is repeated two more times with two new replicate samples. The combined knots from all three runs are placed again in the top screen and run through the process. The accepts, knots and fines are combined from all four runs and weighed to obtain the weight fractions of each.

Several runs of never-dried pulp taken directly from a pulp mill were dried in the jet dryer. The consistency of the initial pulp, the consistency of the pulp fed to the flaker, the null value for the jet dryer, the inlet and outlet air temperature, the steam pressure at the nozzle, the feed air manifold pressure, and the throughput of the various runs are set forth in Table 1 below. The null value is the pressure in inches of water measured at the inlet of the jet dryer where the pulp is introduced. Table 1 sets forth data for multiple runs of Chinook pulp and Table 2 sets forth data for multiple runs of Sockeye pulp.

TABLE 1(A)

| Run # | Manifold pres. psig | Manifold pres. Kpa | M10 temp. inlet (° C.) | M10 temp. outlet (° C.) | Steam pres. psig | Steam pres. Kpa | Steam orifice diameter inches | Steam orifice diameter cm | Steam pressure at manifold psig | Steam pressure at manifold KPa | Feed Solids (at flaker) % | Sonic Knots % | Accepts % | Total Fines % | Textest Permeability (cfm/ft2) | Textest Permeability (m3 min/m2) |
|---|---|---|---|---|---|---|---|---|---|---|---|---|---|---|---|---|
| 0118 | 1.99 | 13.72 | 360.55 | 109.85 | 65.00 | 447.85 | 0.25 | 0.64 |  |  | 35.00 | 51.00 | 31.00 | 18.00 | 42.70 | 12.81 |
| 0119 | 2.00 | 13.78 | 360.58 | 109.11 | 0.00 | 0.00 |  | 2.54 |  |  | 37.50 | 55.00 | 25.00 | 20.00 | 43.00 | 12.90 |
| 0124 | 2.00 | 13.76 | 320.88 | 128.50 | 65.00 | 447.85 | 0.25 | 0.64 |  |  | 35.90 | 54.00 | 34.00 | 12.00 | 52.50 | 15.75 |
| 0125 | 2.00 | 13.78 | 379.94 | 149.04 | 65.00 | 447.85 | 0.25 | 0.64 |  |  | 35.90 | 54.00 | 34.00 | 12.00 | 47.80 | 14.34 |
| 0126 | 2.01 | 13.82 | 320.20 | 129.10 | 0.00 | 0.00 |  | 2.54 |  |  | 35.90 | 55.00 | 33.00 | 12.00 | 40.50 | 12.15 |
| 0127 | 2.00 | 13.77 | 379.58 | 171.58 | 0.00 | 0.00 |  | 2.54 |  |  | 35.90 | 56.00 | 32.00 | 12.00 | 47.70 | 14.31 |
| 0128 | 2.00 | 13.77 | 399.95 | 170.15 | 65.00 | 447.85 | 0.25 | 0.64 |  |  | 36.00 | 53.00 | 36.00 | 11.00 | 39.80 | 11.94 |
| 0129 | 1.99 | 13.73 | 279.54 | 149.93 | 65.00 | 447.85 | 0.25 | 0.64 |  |  | 36.00 | 51.00 | 37.00 | 12.00 | 45.90 | 13.77 |
| 0130 | 2.00 | 13.75 | 400.84 | 189.79 | 65.00 | 447.85 | 0.25 | 0.64 |  |  | 36.00 | 51.00 | 39.00 | 10.00 | 53.30 | 15.99 |
| 0131 | 2.00 | 13.77 | 399.90 | 169.80 | 0.00 | 0.00 |  | 2.54 |  |  | 36.50 | 57.00 | 33.00 | 10.00 | 47.80 | 14.34 |
| 0132 | 2.50 | 17.21 | 359.72 | 168.80 | 65.00 | 447.85 | 0.25 | 0.64 |  |  | 38.00 |  |  |  |  | 0.30 |
| 021 | 2.47 | 17.01 | 360.48 | 179.28 | 0.00 | 0.00 |  | 2.54 |  |  | 38.40 |  |  |  | 52.40 | 15.72 |
| 022 | 1.89 | 13.03 | 182.95 | 73.34 | 0.00 | 0.00 |  | 2.54 |  |  | 38.40 |  |  |  | 52.80 | 15.84 |
| 023 | 2.43 | 16.72 | 183.64 | 73.63 | 0.00 | 0.00 |  | 2.54 |  |  | 38.00 |  |  |  | 62.50 | 18.75 |
| 024 | 2.48 | 17.11 | 140.35 | 53.26 | 0.00 | 0.00 |  | 2.54 |  |  | 38.00 |  |  |  | 48.30 | 14.49 |
| 025 | 2.41 | 16.59 | 149.06 | 50.40 | 0.00 | 0.00 |  | 2.54 |  |  | 38.00 |  |  |  | 35.30 | 10.59 |
| 041 | 2.00 | 13.79 | 360.25 | 169.14 | 0.00 | 0.00 | 0.56 | 1.43 | 0.00 | 0.00 | 37.10 | 54.00 | 35.00 | 11.00 | 45.70 | 13.71 |
| 042 | 2.01 | 13.82 | 359.60 | 172.35 | 65.00 | 447.85 | 0.56 | 1.43 | 21.00 | 144.69 | 37.10 | 44.00 | 45.00 | 11.00 | 45.30 | 13.59 |
| 043 | 2.00 | 13.78 | 359.50 | 169.42 | 150.00 | 1033.50 | 0.56 | 1.43 | 51.00 | 351.39 | 35.90 | 31.00 | 58.00 | 11.00 | 47.60 | 14.28 |
| 044 | 3.72 | 25.64 | 362.11 | 167.30 | 150.00 | 1033.50 | 0.56 | 1.43 | 51.00 | 351.39 | 35.90 | 24.00 | 65.00 | 11.00 | 57.00 | 17.10 |
| 045 | 4.00 | 27.55 | 359.51 | 170.64 | 65.00 | 447.85 | 0.56 | 1.43 | 21.00 | 144.69 | 35.90 | 29.00 | 60.00 | 11.00 | 53.40 | 16.02 |
| 046 | 4.00 | 27.54 | 359.67 | 170.60 | 0.00 | 0.00 | 0.56 | 1.43 | 0.00 | 0.00 | 35.90 | 36.00 | 53.00 | 11.00 | 48.20 | 14.46 |
| 047 | 2.01 | 13.83 | 359.48 | 170.12 | 65.00 | 447.85 | 1.00 | 2.54 | 4.00 | 27.56 | 37.40 | 47.00 | 42.00 | 11.00 | 48.20 | 14.46 |
| 048 | 3.99 | 27.47 | 359.40 | 171.34 | 65.00 | 447.85 | 1.00 | 2.54 | 4.00 | 27.56 | 37.40 | 31.00 | 58.00 | 11.00 | 51.50 | 15.45 |
| 049 | 4.00 | 27.57 | 359.95 | 170.26 | 150.00 | 1033.50 | 1.00 | 2.54 | 15.00 | 103.35 | 37.40 | 26.00 | 63.00 | 11.00 | 54.00 | 16.20 |
| 0410 | 1.94 | 13.40 | 359.76 | 171.11 | 150.00 | 1033.50 | 1.00 | 2.54 | 15.00 | 103.35 | 37.10 | 36.00 | 53.00 | 11.00 | 50.60 | 15.18 |
| 0411 | 1.95 | 13.43 | 359.59 | 169.66 | 0.00 | 0.00 |  | 2.54 | 0.00 | 0.00 | 32.00 | 48.00 | 41.00 | 11.00 | 45.90 | 13.77 |
| 051 | 1.98 | 13.65 | 359.54 | 170.70 | 0.00 | 0.00 |  | 2.54 | 0.00 | 0.00 | 25.70 | 42.00 | 47.00 | 11.00 | 40.50 | 12.15 |
| 052 | 4.00 | 27.54 | 359.87 | 169.35 | 0.00 | 0.00 |  | 2.54 | 0.00 | 0.00 | 25.70 | 22.00 | 68.00 | 10.00 | 50.40 | 15.12 |
| 053 | 2.01 | 13.86 | 359.68 | 169.65 | 150.00 | 1033.50 | 0.56 | 1.43 | 52.00 | 358.28 | 32.10 | 16.00 | 73.00 | 11.00 | 54.60 | 16.38 |
| 054 | 2.02 | 13.91 | 359.25 | 170.25 | 150.00 | 1033.50 | 0.56 | 1.43 | 52.00 | 358.28 | 28.30 | 15.00 | 75.00 | 10.00 | 50.40 | 15.12 |
| 055 | 1.99 | 13.72 | 359.72 | 169.56 | 65.00 | 447.85 | 0.56 | 1.43 | 22.00 | 151.58 | 28.30 | 22.00 | 67.00 | 11.00 | 46.90 | 14.07 |
| 056 | 2.01 | 13.82 | 359.39 | 169.52 | 65.00 | 447.85 | 0.56 | 1.43 | 22.00 | 151.58 | 31.70 | 35.00 | 54.00 | 11.00 | 45.80 | 13.74 |
| 057 | 4.00 | 27.57 | 359.19 | 168.96 | 150.00 | 1033.50 | 0.56 | 1.43 | 52.00 | 358.28 | 32.10 | 14.00 | 73.00 | 13.00 | 49.10 | 14.73 |
| 058 | 4.00 | 27.55 | 360.09 | 169.21 | 65.00 | 447.85 | 0.56 | 1.43 | 22.00 | 151.58 | 32.10 | 23.00 | 65.00 | 12.00 | 55.60 | 16.68 |
| 059 | 3.85 | 26.50 | 360.37 | 168.14 | 65.00 | 447.85 | 0.56 | 1.43 | 22.00 | 151.58 | 25.70 | 13.00 | 76.00 | 11.00 | 51.60 | 15.48 |
| 111 | 1.98 | 13.68 | 360.28 | 168.87 | 250.00 | 1722.50 | 0.38 | 0.95 | 153.00 | 1054.17 | 33.30 | 31.00 | 60.00 | 9.00 | 66.00 | 19.80 |
| 112 | 3.99 | 27.51 | 359.90 | 168.07 | 0.00 | 0.00 |  | 2.54 |  | 6.89 | 33.30 | 32.00 | 57.00 | 11.00 | 62.70 | 18.81 |
| 113 | 3.99 | 27.50 | 360.84 | 171.32 | 250.00 | 1722.50 | 0.38 | 0.95 | 153.00 | 1054.17 | 33.30 | 21.00 | 69.00 | 10.00 | 55.10 | 16.53 |
| 114 | 4.00 | 27.57 | 399.46 | 143.80 | 250.00 | 1722.50 | 0.38 | 0.95 | 153.00 | 1054.17 | 37.00 | 27.00 | 61.00 | 12.00 | 61.00 | 18.30 |

TABLE 1 (B)

| Run # | Unrefined Bulk cm3/g | Unrefined Density kg/m3 | Unrefined Breaking Length km | Unrefined Elongation % | Unrefined Tensile Energy Absorption J/m2 | Unrefined Tensile kN/m | Tensile ratio | Unrefined Fiber Length mm | Unrefined Curl Index | Unrefined Fines Content |
|---|---|---|---|---|---|---|---|---|---|---|
| 0118 | 5.03 | 199.20 | 0.67 | 2.20 | 14.98 | 3.78 | 11.29 | 1.90 | 0.28 | 5.90 |
| 0119 | 5.05 | 198.30 | 0.73 | 2.25 | 15.52 | 3.95 | 10.88 | 1.90 | 0.29 | 5.20 |
| 0124 | 5.36 | 186.90 | 0.40 | 1.96 | 7.55 | 2.19 | 24.00 | 1.91 | 0.27 | 5.10 |
| 0125 | 5.34 | 187.50 | 0.44 | 1.95 | 8.54 | 2.48 | 19.29 | 1.93 | 0.27 | 5.30 |
| 0126 | 5.02 | 199.50 | 0.59 | 2.34 | 13.52 | 3.34 | 12.14 | 1.93 | 0.28 | 5.10 |
| 0127 | 5.22 | 191.70 | 0.51 | 2.34 | 11.39 | 2.83 | 16.87 | 1.87 | 0.28 | 5.50 |
| 0128 | 5.06 | 198.00 | 0.54 | 2.10 | 11.54 | 3.09 | 12.88 | 1.87 | 0.26 | 5.20 |
| 0129 | 5.07 | 197.30 | 0.53 | 2.15 | 11.74 | 2.96 | 15.49 | 1.94 | 0.26 | 5.00 |
| 0130 | 5.33 | 187.70 | 0.46 | 1.94 | 8.69 | 2.55 | 20.93 | 1.89 | 0.25 | 4.90 |
| 0131 | 5.33 | 187.80 | 0.45 | 2.14 | 9.46 | 2.48 | 19.24 | 1.91 | 0.27 | 4.10 |
| 0132 |  |  |  |  |  |  |  |  |  |  |
| 021 | 5.18 | 193.60 | 0.50 | 1.78 | 9.14 | 2.82 | 18.57 | 1.93 | 0.31 | 4.90 |
| 022 | 5.22 | 192.00 | 0.51 | 1.99 | 10.51 | 2.86 | 18.45 | 1.95 | 0.32 | 5.10 |
| 023 | 5.42 | 184.80 | 0.44 | 1.81 | 7.22 | 2.19 | 28.57 | 1.88 | 0.31 | 5.60 |
| 024 | 5.22 | 191.90 | 0.46 | 1.52 | 7.01 | 2.54 | 19.05 | 1.89 | 0.30 | 6.90 |
| 025 | 4.80 | 208.80 | 0.69 | 2.09 | 14.68 | 3.91 | 9.02 | 1.97 | 0.28 | 6.50 |
| 041 | 5.06 | 198.20 | 0.46 | 1.65 | 7.60 | 2.61 | 17.51 | 2.18 | 0.22 | 4.10 |
| 042 | 5.12 | 195.80 | 0.47 | 1.78 | 8.04 | 2.63 | 17.21 | 2.11 | 0.21 | 4.10 |
| 043 | 5.41 | 185.00 | 0.40 | 2.16 | 8.33 | 2.28 | 20.84 | 2.10 | 0.23 | 4.40 |
| 044 | 5.52 | 181.80 | 0.40 | 1.92 | 7.20 | 2.24 | 25.46 | 2.10 | 0.24 | 3.70 |

TABLE 1 (B)-continued

| Run # | Unrefined Bulk cm3/g | Unrefined Density kg/m3 | Unrefined Breaking Length km | Unrefined Elongation % | Unrefined Tensile Energy Absorption J/m2 | Unrefined Tensile kN/m | Tensile ratio | Unrefined Fiber Length mm | Unrefined Curl Index | Unrefined Fines Content |
|---|---|---|---|---|---|---|---|---|---|---|
| 045 | 5.29 | 189.20 | 0.45 | 1.81 | 8.03 | 2.52 | 21.15 | 2.01 | 0.20 | 5.40 |
| 046 | 5.32 | 188.00 | 0.46 | 2.01 | 8.95 | 2.56 | 18.84 | 2.00 | 0.11 | 6.70 |
| 047 | 5.22 | 191.80 | 0.49 | 2.07 | 9.59 | 2.68 | 17.96 | 2.09 | 0.20 | 5.20 |
| 048 | 5.27 | 189.90 | 0.49 | 2.04 | 9.37 | 2.72 | 18.94 | 2.04 | 0.21 | 5.00 |
| 049 | 5.42 | 185.10 | 0.40 | 1.71 | 6.69 | 2.25 | 24.00 | 1.94 | 0.20 | 8.30 |
| 0410 | 5.28 | 189.80 | 0.44 | 1.84 | 7.99 | 2.51 | 20.18 | 2.03 | 0.20 | 5.70 |
| 0411 | 5.12 | 195.60 | 0.47 | 2.10 | 9.88 | 2.66 | 17.25 | 2.13 | 0.19 | 4.60 |
| 051 | 5.12 | 195.60 | 0.50 | 1.98 | 10.41 | 2.97 | 13.64 | 2.07 | 0.19 | 5.40 |
| 052 | 5.44 | 184.30 | 0.45 | 2.01 | 9.32 | 2.62 | 19.27 | 2.11 | 0.23 | 3.90 |
| 053 | 5.52 | 181.40 | 0.34 | 1.64 | 5.53 | 1.90 | 28.71 | 2.11 | 0.21 | 4.80 |
| 054 | 5.50 | 182.30 | 0.35 | 1.58 | 6.19 | 2.14 | 23.60 | 2.12 | 0.20 | 5.20 |
| 055 | 5.37 | 186.50 | 0.38 | 1.71 | 6.76 | 2.20 | 21.28 | 2.20 | 0.21 | 3.60 |
| 056 | 5.24 | 191.10 | 0.46 | 1.71 | 7.38 | 2.56 | 17.86 | 2.17 | 0.20 | 5.00 |
| 057 | 5.29 | 189.40 | 0.34 | 1.49 | 5.79 | 2.02 | 24.36 | 2.07 | 0.23 | 4.20 |
| 058 | 5.34 | 187.60 | 0.38 | 1.67 | 6.40 | 2.20 | 25.29 | 2.15 | 0.20 | 4.30 |
| 059 | 5.37 | 186.60 | 0.42 | 1.90 | 7.63 | 2.38 | 21.72 | 1.85 | 0.21 | 10.30 |
| 111 | 5.68 | 176.70 | 0.36 | 1.79 | 6.19 | 0.35 | 33.30 | 2.18 | 0.21 | 3.70 |
| 112 | 5.57 | 179.80 | 0.38 | 1.79 | 6.69 | 0.37 | 29.91 | 2.17 | 0.24 | 4.00 |
| 113 | 5.75 | 174.40 | 0.32 | 1.82 | 7.00 | 0.37 | 25.94 | 2.20 | 0.24 | 3.10 |
| 114 | 5.62 | 178.30 | 0.40 | 1.80 | 6.92 | 0.39 | 27.67 | 2.14 | 0.23 | 4.30 |

TABLE 2(A)

| Run # | Manifold pres. psig | Manifold pres. Kpa | M10 temp. inlet (° C.) | M10 temp. outlet (° C.) | Steam pres. psig | Steam pres. Kpa | Steam orifice diameter inches | Steam orifice diameter cm | Steam pressure at manifold psig | Steam pressure at manifold KPa | Feed Solids (at flaker) % | Sonic Knots % | Accepts % | Total Fines % | Textest Permeability (cfm/ ft2) | Textest Permeability (m3 min/ m2) |
|---|---|---|---|---|---|---|---|---|---|---|---|---|---|---|---|---|
| 011 | 2.00 | 13.76 | 399.58 | 130.91 | 0.00 | | | | | | 37.80 | 47.00 | 39.00 | 14.00 | 57.10 | 17.13 |
| 012 | 2.00 | 13.75 | 399.04 | 109.84 | 0.00 | | | | | | 37.80 | 43.00 | 36.00 | 21.00 | 57.80 | 17.34 |
| 013 | 2.00 | 13.77 | 398.73 | 100.12 | 0.00 | | | | | | 37.80 | 44.00 | 33.00 | 23.00 | 60.90 | 18.27 |
| 014 | 2.00 | 13.77 | 398.57 | 95.51 | 0.00 | | | | | | 37.80 | 46.00 | 33.00 | 21.00 | 58.10 | 17.43 |
| 015 | 2.00 | 13.78 | 359.70 | 168.41 | 0.00 | | | | | | 37.50 | 48.00 | 42.00 | 10.00 | 45.50 | 13.65 |
| 016 | 2.00 | 13.79 | 319.68 | 129.66 | 65.00 | 447.85 | 0.25 | 0.64 | | | 37.50 | 45.00 | 43.00 | 12.00 | 53.60 | 16.08 |
| 017 | 2.00 | 13.78 | 319.72 | 149.11 | 65.00 | 447.85 | 0.25 | 0.64 | | | 39.40 | 46.00 | 42.00 | 12.00 | 46.50 | 13.95 |
| 018 | 2.00 | 13.78 | 320.59 | 129.85 | 0.00 | 0.00 | | | | | 38.20 | 49.00 | 39.00 | 12.00 | 43.50 | 13.05 |
| 019 | 2.00 | 13.79 | 359.54 | 150.92 | 65.00 | 447.85 | 0.25 | 0.64 | | | 38.20 | 48.00 | 40.00 | 12.00 | 48.10 | 14.43 |
| 0112 | 2.00 | 13.78 | 399.91 | 191.05 | 0.00 | 0.00 | | | | | 38.20 | 50.00 | 39.00 | 11.00 | 44.00 | 13.20 |
| 0113 | 2.00 | 13.77 | 399.57 | 204.13 | 0.00 | 0.00 | | | | | | 47.00 | 31.00 | 22.00 | | |
| 0114 | 2.00 | 13.77 | 399.48 | 200.64 | 0.00 | 0.00 | | | | | 39.50 | | | | 47.50 | 14.25 |
| 031 | 2.02 | 13.91 | 359.48 | 168.70 | 0.00 | 0.00 | | | | | 35.00 | 43.00 | 47.00 | 10.00 | 51.40 | 15.42 |
| 032 | 4.02 | 27.71 | 359.34 | 168.34 | 0.00 | 0.00 | | | | | 35.00 | 21.00 | 67.00 | 12.00 | 52.20 | 15.66 |
| 033 | 4.00 | 27.56 | 359.80 | 168.79 | 150.00 | 1033.50 | 0.25 | 0.64 | | | 35.00 | 22.00 | 66.00 | 12.00 | 54.60 | 16.38 |
| 034 | 2.04 | 14.02 | 359.32 | 169.88 | 150.00 | 1033.50 | 0.25 | 0.64 | | | 36.50 | 30.00 | 59.00 | 11.00 | 53.10 | 15.93 |
| 035 | 3.01 | 20.71 | 359.66 | 168.20 | 150.00 | 1033.50 | 0.25 | 0.64 | | | 36.50 | 22.00 | 67.00 | 11.00 | 53.70 | 16.11 |
| 036 | 4.41 | 30.39 | 360.08 | 176.81 | 0.00 | 0.00 | | | | | 36.50 | 13.00 | 75.00 | 12.00 | 63.60 | 19.08 |
| 037 | 4.41 | 30.37 | 360.27 | 168.69 | 0.00 | 0.00 | | | | | | | | | | |
| 071 | 2.00 | 13.77 | 360.42 | 169.89 | 0.00 | 0.00 | | | | | 37.20 | 41.00 | 45.00 | 14.00 | 51.70 | 15.51 |
| 072 | 2.00 | 13.78 | 359.40 | 170.65 | 250.00 | 1722.50 | 0.56 | 1.43 | 100.00 | 689.00 | 37.20 | 13.00 | 77.00 | 10.00 | 60.30 | 18.09 |
| 073 | 1.96 | 13.47 | 359.71 | 168.73 | 0.00 | 0.00 | | | | | 32.40 | 35.00 | 54.00 | 11.00 | 56.40 | 16.92 |
| 074 | 1.95 | 13.45 | 359.45 | 167.81 | 250.00 | 1722.50 | 0.56 | 1.43 | 100.00 | 689.00 | 33.10 | 3.00 | 85.00 | 12.00 | 74.70 | 22.41 |
| 075 | 1.98 | 13.62 | 359.53 | 171.57 | 250.00 | 1722.50 | 0.56 | 1.43 | 59.00 | 406.51 | 32.90 | 17.00 | 73.00 | 10.00 | 52.20 | 15.66 |
| 076 | 4.00 | 27.57 | 360.49 | 169.52 | 0.00 | 0.00 | | | | | 32.90 | 16.00 | 74.00 | 10.00 | 59.00 | 17.70 |
| 077 | 3.98 | 27.45 | 360.22 | 169.13 | 150.00 | 1033.50 | 0.56 | 1.43 | | | 32.90 | 8.00 | 81.00 | 11.00 | 65.40 | 19.62 |
| 078 | 3.41 | 23.50 | 328.91 | 171.11 | 250.00 | 1722.50 | 0.56 | 1.43 | 100.00 | 689.00 | 32.90 | 2.00 | 84.00 | 14.00 | 70.90 | 21.27 |
| 079 | 2.56 | 17.64 | 359.20 | 170.25 | 250.00 | 1722.50 | 0.56 | 1.43 | 100.00 | 689.00 | 32.90 | 5.00 | 83.00 | 12.00 | 63.70 | 19.11 |
| 0710 | 3.00 | 20.65 | 359.33 | 170.30 | 250.00 | 1722.50 | 0.56 | 1.43 | 100.00 | 689.00 | 32.90 | 8.00 | 82.00 | 10.00 | 76.60 | 22.98 |
| 0711 | 3.49 | 24.06 | 360.36 | 171.51 | 250.00 | 1722.50 | 0.56 | 1.43 | 100.00 | 689.00 | 32.70 | 3.00 | 85.00 | 12.00 | 59.40 | 17.82 |
| 0712 | 2.10 | 14.47 | 359.00 | 171.50 | 250.00 | 1722.50 | 0.56 | 1.43 | 100.00 | 689.00 | 28.30 | 4.00 | 85.00 | 11.00 | 66.30 | 19.89 |
| 0713 | 3.43 | 23.63 | 360.92 | 169.69 | 250.00 | 1722.50 | 0.56 | 1.43 | 100.00 | 689.00 | 28.30 | 1.00 | 86.00 | 13.00 | 65.00 | 19.50 |
| 0714 | 1.96 | 13.51 | 359.31 | 169.93 | 0.00 | 0.00 | | | | | 28.10 | 25.00 | 64.00 | 11.00 | 52.10 | 15.63 |
| 0715 | 3.99 | 27.47 | 360.20 | 168.95 | 0.00 | 0.00 | | | | | 28.10 | 9.00 | 80.00 | 11.00 | 51.30 | 15.39 |
| 0716 | 4.00 | 27.56 | 360.86 | 168.97 | 0.00 | 0.00 | | | | | 37.80 | 21.00 | 68.00 | 11.00 | 53.40 | 16.02 |
| 0717 | 3.50 | 24.09 | 360.75 | 169.70 | 150.00 | 1033.50 | 0.56 | 1.43 | 51.00 | 351.39 | 38.40 | 10.00 | 78.00 | 12.00 | 54.90 | 16.47 |
| 0718 | 3.50 | 24.10 | 359.42 | 171.10 | 250.00 | 1722.50 | 0.56 | 1.43 | 100.00 | 689.00 | 38.40 | 5.00 | 83.00 | 12.00 | 59.60 | 17.88 |
| 0719 | 2.07 | 14.28 | 319.39 | 130.32 | 250.00 | 1722.50 | 0.56 | 1.43 | 100.00 | 689.00 | 38.10 | 11.00 | 76.00 | 13.00 | 54.70 | 16.41 |
| 0720 | 3.50 | 24.11 | 319.62 | 129.90 | 250.00 | 1722.50 | 0.56 | 1.43 | 100.00 | 689.00 | 38.10 | 9.00 | 79.00 | 12.00 | 51.20 | 15.36 |
| 0721 | 3.50 | 24.12 | 320.51 | 131.78 | 150.00 | 1033.50 | 0.56 | 1.43 | 51.00 | 351.39 | 38.10 | 14.00 | 74.00 | 12.00 | 51.10 | 15.33 |

TABLE 2(A)-continued

| | Manifold pres. | | M10 temp. inlet | outlet | Steam pres. | | Steam orifice diameter | | Steam pressure at manifold | | Feed Solids (at flaker) | Sonic Knots | Total Accepts | Fines | Textest Permeability | |
|---|---|---|---|---|---|---|---|---|---|---|---|---|---|---|---|---|
| Run # | psig | Kpa | (° C.) | (° C.) | psig | Kpa | inches | cm | psig | KPa | % | % | % | % | (cfm/ft2) | (m3 min/m2) |
| 0722 | 3.50 | 24.12 | 320.68 | 129.06 | 150.00 | 1033.50 | 0.56 | 1.43 | 52.00 | 358.28 | 32.20 | 10.00 | 78.00 | 12.00 | 47.10 | 14.13 |
| 0723 | 3.50 | 24.14 | 399.89 | 200.49 | 150.00 | 1033.50 | 0.56 | 1.43 | 52.00 | 358.28 | 32.20 | 6.00 | 83.00 | 11.00 | 65.50 | 19.65 |
| 0724 | 3.47 | 23.90 | 399.26 | 128.84 | 150.00 | 1033.50 | 0.56 | 1.43 | 52.00 | 358.28 | 32.90 | 11.00 | 77.00 | 12.00 | 54.40 | 16.32 |
| 091 | 1.96 | 13.51 | 360.15 | 171.19 | 250.00 | 1722.50 | 0.38 | 0.95 | 132.00 | 909.48 | 33.80 | 15.00 | 74.00 | 11.00 | 59.60 | 17.88 |

TABLE 2 (B)

| Run # | Unrefined Bulk cm3/g | Unrefined Density kg/m3 | Unrefined Breaking Length km | Unrefined Elongation % | Unrefined Tensile Energy & Absorption J/m2 | Unrefined Tensile kN/m | Unrefined Fiber Length mm | Unrefined Curl Index | Fines Content |
|---|---|---|---|---|---|---|---|---|---|
| 1 | 5.04 | 198.60 | 0.48 | 1.14 | 7.25 | 2.68 | 2.22 | 0.23 | 5.80 |
| 2 | 5.10 | 196.20 | 0.46 | 1.23 | 6.86 | 2.53 | 2.20 | 0.24 | 5.60 |
| 3 | 5.18 | 193.30 | 0.47 | 1.21 | 6.07 | 2.57 | 2.24 | 0.25 | 5.50 |
| 4 | 5.21 | 192.10 | 0.48 | 1.22 | 6.90 | 2.67 | 2.21 | 0.25 | 5.90 |
| 5 | 4.87 | 205.40 | 0.48 | 1.43 | 6.20 | 2.76 | 2.17 | 0.25 | 6.00 |
| 6 | 5.12 | 195.70 | 0.49 | 1.45 | 8.82 | 2.84 | 2.15 | 0.24 | 6.60 |
| 7 | 4.80 | 209.30 | 0.56 | 1.32 | 7.35 | 3.29 | 2.00 | 0.23 | 8.10 |
| 8 | 4.82 | 207.90 | 0.63 | 1.20 | 8.94 | 3.72 | 2.17 | 0.24 | 5.90 |
| 9 | 4.88 | 205.00 | 0.53 | 1.28 | 6.45 | 3.04 | 2.17 | 0.24 | 5.80 |
| 12 | 4.86 | 206.20 | 0.50 | 1.29 | 6.21 | 2.99 | 2.15 | 0.24 | 5.30 |
| 13 | | | | | | | | | |
| 14 | 4.92 | 203.60 | 0.49 | 1.41 | 6.37 | 2.85 | 2.15 | 0.23 | 5.40 |
| 1 | 5.06 | 197.70 | 0.47 | 1.06 | 4.44 | 2.62 | 2.24 | 0.21 | 6.80 |
| 2 | 5.05 | 198.20 | 0.48 | 1.06 | 4.63 | 2.70 | 2.11 | 0.29 | 6.80 |
| 3 | 5.18 | 193.60 | 0.42 | 0.98 | 4.32 | 2.38 | 2.19 | 0.27 | 5.90 |
| 4 | 5.13 | 195.10 | 0.48 | 1.02 | 4.57 | 2.70 | 2.13 | 0.24 | 6.60 |
| 5 | 5.23 | 191.40 | 0.47 | 1.13 | 5.06 | 2.65 | 2.13 | 0.25 | 6.90 |
| 6 | | | | | | | | | |
| 7 | 5.44 | 184.10 | 0.24 | 0.95 | 2.12 | 1.38 | 2.17 | 0.22 | 7.40 |
| 1 | 5.20 | 192.40 | 0.40 | 1.11 | 4.00 | 22.83 | 2.38 | 0.17 | 4.40 |
| 2 | 5.38 | 186.10 | 0.39 | 1.16 | 4.04 | 23.05 | 2.19 | 0.16 | 6.50 |
| 3 | 5.26 | 190.60 | 0.43 | 1.09 | 4.15 | 23.70 | 2.33 | 0.14 | 4.70 |
| 4 | 5.62 | 178.20 | 0.30 | 1.08 | 3.11 | 17.73 | 2.21 | 0.17 | 6.20 |
| 5 | 5.28 | 189.60 | 0.44 | 1.07 | 4.49 | 25.65 | 2.45 | 0.17 | 3.60 |
| 6 | 5.37 | 186.40 | 0.38 | 1.10 | 4.02 | 22.94 | 2.23 | 0.16 | 4.90 |
| 7 | 5.48 | 182.70 | 0.34 | 1.08 | 3.63 | 20.73 | 2.40 | 0.16 | 4.00 |
| 8 | 5.66 | 176.90 | 0.27 | 1.17 | 3.03 | 17.32 | 2.27 | 0.17 | 4.90 |
| 9 | 5.50 | 181.90 | 0.35 | 1.06 | 3.46 | 19.77 | 2.35 | 0.16 | 4.60 |
| 10 | 5.68 | 176.30 | 0.28 | 1.09 | 3.24 | 18.49 | 2.40 | 0.18 | 4.30 |
| 11 | 5.42 | 184.90 | 0.36 | 1.09 | 3.96 | 22.64 | 2.38 | 0.17 | 4.40 |
| 12 | 5.54 | 180.90 | 0.36 | 1.11 | 3.85 | 21.96 | 2.19 | 0.16 | 6.70 |
| 13 | 5.49 | 182.40 | 0.36 | 1.27 | 4.15 | 23.72 | 2.35 | 0.17 | 4.40 |
| 14 | 5.19 | 192.70 | 0.50 | 1.16 | 5.40 | 30.86 | 2.43 | 0.15 | 3.90 |
| 15 | 5.26 | 190.20 | 0.46 | 1.12 | 4.63 | 26.42 | 2.36 | 0.15 | 4.10 |
| 16 | 5.12 | 195.50 | 0.48 | 1.29 | 5.81 | 33.18 | 2.35 | 0.15 | 4.50 |
| 17 | 5.26 | 190.20 | 0.42 | 1.16 | 4.58 | 26.16 | 2.24 | 0.17 | 4.90 |
| 18 | 5.43 | 184.40 | 0.37 | 1.19 | 4.26 | 24.33 | 2.33 | 0.15 | 4.80 |
| 19 | 5.13 | 195.00 | 0.46 | 1.17 | 5.12 | 29.26 | 2.26 | 0.15 | 5.90 |
| 20 | 5.04 | 198.50 | 0.52 | 1.36 | 6.80 | 38.81 | 2.37 | 0.16 | 4.70 |
| 21 | 5.01 | 199.70 | 0.51 | 1.12 | 5.00 | 28.58 | 2.33 | 0.14 | 5.20 |
| 22 | 5.10 | 196.10 | 0.53 | 1.26 | 6.35 | 36.28 | 2.32 | 0.15 | 4.80 |
| 23 | 5.55 | 180.40 | 0.31 | 1.11 | 3.28 | 18.73 | 2.33 | 0.17 | 4.40 |
| 24 | 5.22 | 191.80 | 0.48 | 1.30 | 5.90 | 33.71 | 2.39 | 0.16 | 4.70 |
| 1 | 5.42 | 184.80 | 0.38 | 1.10 | 4.02 | 0.38 | 2.39 | 0.17 | 4.00 |

Figure 8:
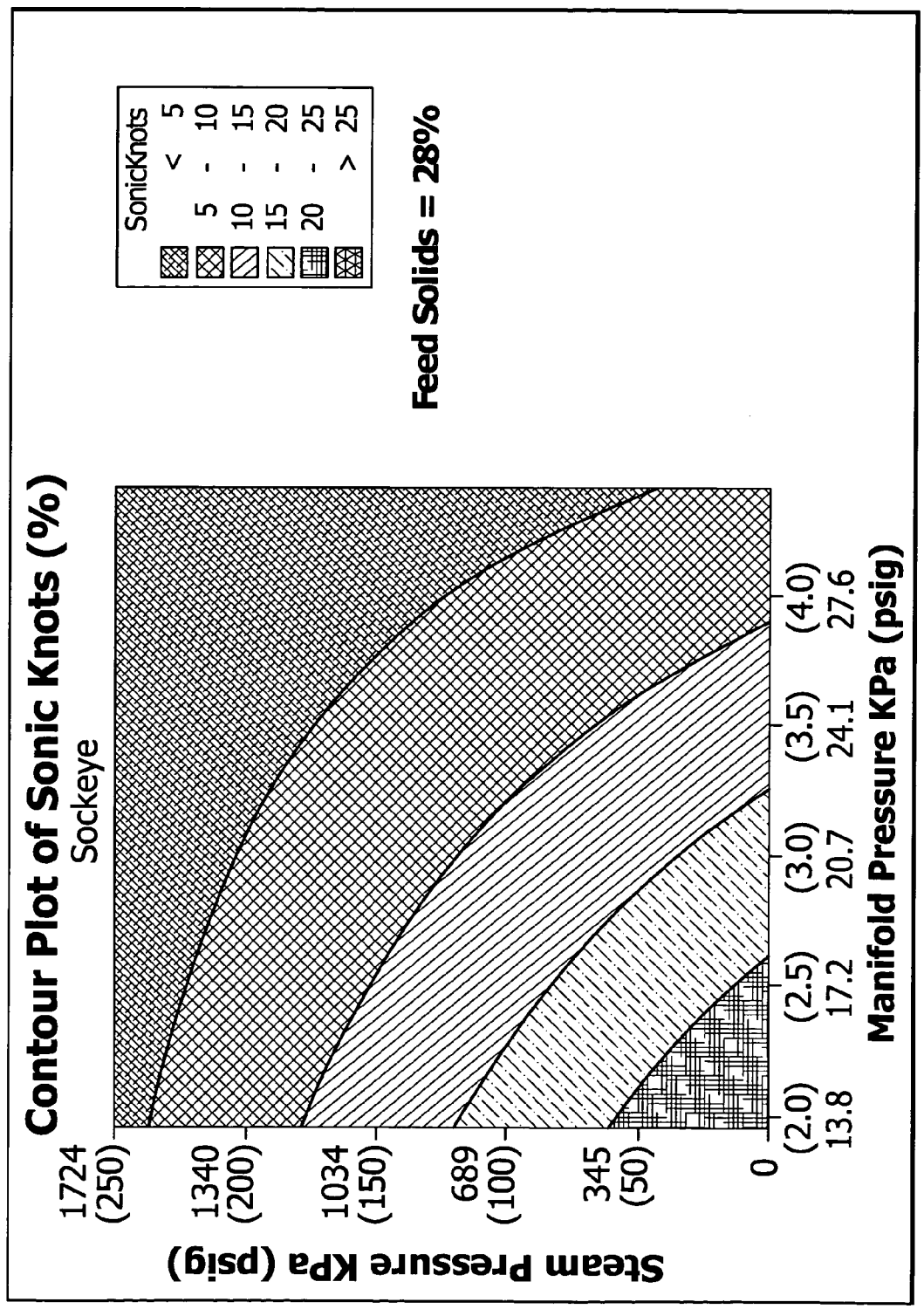
FIG. 8 is a contour plot of the estimated sonic knots versus steam pressure and manifold pressure for Douglas fir (Sockeye pulp), based on a response surface regression model equation.

The data from Tables 1 and 2 were analyzed using a response surface regression to show trends in Sockeye and Chinook pulp sonic knots (%) due to changes in manifold pressure, steam pressure and feed solids. The contour plots based on the fitted model response surface regression equation are shown in FIGS. 8 (Sockeye pulp) and 10 (Chinook pulp). Lowest sonic knots occur with higher steam pressures and manifold pressures. As feed solids increase, knots increase, but are still ameliorated by higher steam and manifold pressures. The statistical analysis and explanations for these results are presented in Tables 3 and 4.

TABLE 3

Sonic Knots Results for SOCKEYE PULP
Response Surface Regression: Sonic Knots versus Manifold
Pressure, Steam Pressure and Feed Solids
The analysis was done using coded units.
Estimated Regression Coefficients for Sonic Knots

| Term | Coef | SE Coef | T | P |
|---|---|---|---|---|
| Constant | 15.477 | 0.6813 | 22.717 | 0.000 |
| Manifold Pressure | −10.182 | 0.9746 | −10.447 | 0.000 |
| Steam Pressure | −10.358 | 0.8153 | −12.705 | 0.000 |
| Feed Solids | 6.768 | 1.1765 | 5.752 | 0.000 |
| ManPress * SteamPress | 3.838 | 1.0642 | 3.607 | 0.001 |
| ManPress * FeedSolids | −4.468 | 1.5944 | −2.803 | 0.009 |
| SteamPress * FeedSolids | −3.599 | 1.2181 | −2.954 | 0.006 |

$S = 3.619$
$R\text{-}Sq = 95.9\%$
$R\text{-}Sq \text{ (adj)} = 95.0\%$

The results of the response surface regression on the effect of steam pressure (psig), manifold pressure (psig) and feed solids (%) on sonic knots (%) for Sockeye pulp are displayed. The R-Sq shows that 95.9% of the variability in the sonic knots is explained by the above statistical model. The regression analysis shows that steam pressure (psig), manifold pressure (psig), feed solids (%), manifold pressure by steam pressure interaction, manifold pressure by feed solids interaction and steam pressure by feed solids interaction all have significant regression coefficients. This means that changes to these process settings have a significant effect on sonic knots for Sockeye pulp. The sign of the coefficient indicates the direction of the effect. For example, this model showed that increasing manifold pressure decreases sonic knots.

TABLE 4

Sonic Knots Results for CHINOOK PULP
Response Surface Regression: Sonic Knots versus Manifold
Pressure, Steam Pressure and Feed Solids
The analysis was done using coded units.
Estimated Regression Coefficients for Sonic Knots

| Term | Coef | SE Coef | T | P |
|---|---|---|---|---|
| Constant | 23.458 | 1.535 | 15.281 | 0.000 |
| Manifold Pressure | −6.515 | 1.143 | −5.699 | 0.000 |
| Steam Pressure | −10.090 | 1.614 | −6.250 | 0.000 |
| Feed Solids | 12.578 | 1.656 | 7.598 | 0.000 |
| SteamPress * SteamPress | 6.868 | 2.372 | 2.895 | 0.007 |
| ManPress * SteamPress | 3.253 | 1.674 | 1.943 | 0.062 |

$S = 5.171$
$R\text{-}Sq = 89.2\%$
$R\text{-}Sq \text{ (adj)} = 87.3\%$

The results of the response surface regression on the effect of steam pressure (KPa), manifold pressure (KPa) and feed solids (%) on sonic knots (%) for Chinook pulp are displayed above. The R-Sq shows that 89.2% of the variability in sonic knots is explained by the statistical model. The regression analysis shows that steam pressure (KPa), manifold pressure (KPa), feed solids (%), steam pressure squared (quadratic effect) and manifold pressure by steam pressure interaction all have significant regression coefficients. This means that changes to these process settings have a significant effect on sonic knots for Chinook pulp. The sign of the coefficient indicates the direction of the effect. For example, in this model increasing manifold pressure decreases sonic knots.

The permeability of the dried pulp was also measured using the following test method. First, a sheet of high permeability is formed in accordance with a modified standard method used for hand sheet preparation (Tappi T205 and ISO 5269). The following equipment is required: Tappi sheet mold as described in Tappi T205 equipped for filling with the deionized water; compressed air supply at low pressure to provide vacuum and air to couch the sheet; Whatman No. 1,185 mm. filter papers pre-wetted with deionized water; a standard disintegrater; mirror polished drying disks having a 160 mm diameter; and drying rings with rubber seatings for holding the sheets to the disk during drying. A 30.5 gram oven-dried (100% solids) pulp sample is weighed. A moisture content of 8% can be assumed for an air-dried sample. The pulp sample is transferred to the disintegrater container without soaking and diluted to 2000±500 grams of de-ionized water. The diluted pulp sample is placed in the disintegrater. The counter on the disintegrater is set for 2500-40000 revolutions. The disintegrated pulp is then placed in a vessel and diluted to 10 liters with de-ionized water.

The consistency of the pulp is then determined by taking a 500 gram aliquot while the sample is vigorously agitated. The sample is filtered onto a tared filter paper in a funnel. The sample is then dried in a speed dryer. The consistency ($C_1$) is determined by dividing the weight of the dry pulp mass by the weight of the aliquot. The consistency is corrected to 0.3%.

The 0.3% consistency slurry is then thoroughly stirred and a 660 gram sample is weighed out to prepare a sheet equal to 1.96 O.D. grams. A sheet is then formed by first cleaning the sheet machine screen by gently rubbing its surface to clear away any adhering fibers. The machine is closed and half filled with de-ionized water. A diluted pulp sample is poured onto the sheet machine and then the sheet machine is filled with de-ionized water. The perforated disk stirrer is inserted into the machine. It is moved up and down five times keeping the perforated disk below the surface of the liquid for about 6 seconds. During the down stroke of the sixth plunge the machine is fully opened to drain the liquid rapidly. At the end of the up stroke, the stirrer is gently withdrawn to allow the water to drain through the sheet under suction from the drop legs of the machine. The sheet machine is then opened and a piece of pre-wetted filter paper is placed over the drain sheet. The vacuum couch is used to remove water from the sheet. The sheet is then lifted from the mold with the air couch. The sheet is flipped over and is vacuum couched from the opposite side. The sheet is removed from the mold. A press plate is added to the side of the sheet with the filter paper and the sheet with filter paper and press plate is placed into the drying ring. Another drying ring is placed on top of the assembled drying ring and pressed into place. The foregoing steps are repeated to form remaining sheets. The empty drying ring is placed on top of the stack with weight on top of it to secure hand sheets during drying. The sheets are allowed to dry fully before removing them from the drying rings. After drying, the stack is disassembled and the hand sheets are peeled from the press plate. The sheets are now ready for testing. Typically, ten sheets are made per pulp sample for tensile, bulk, and air permeability (Textest testing).

The sheets are then tested in a TEXTEST FX 3300 Air Permeability Tester. This method of testing is based upon a modification of ASTM Standard D 1776. This procedure measures the volume of air passing through a pulp sample. Air permeability of the test specimen is determined from the pressure drop across the orifice of the tester, which is 38 cm$^2$. A single sample will take about 15 minutes to test with five or ten repetitions. The filter paper used to support the samples while drying must be removed before testing. The FX 3300 machine is then turned on and allowed to warm up for at least ten minutes. A testing pressure, preferably 125 Pa, is selected. Other pressure settings may be chosen. The calibration plate provided by the machine manufacturer is clamped into position. Note the notch on the plate and the pin on the tester must align in order to turn on the machine. The null button is then pressed. An air flow level that gives a read out in the green range (LED read out on the front panel) is selected. The reading from the machine will match the calibration plate (±1%). The samples are clamped into position marked side up, and the air flow is allowed to equilibrate in the green range (10-15 seconds). The air permeability reading on the machine is then noted. One reading per sheet is required and normally 5-10 sheets per sample run are also required. The readings are given in cubic feet per minute per square foot (ft$^3$/min/ft$^2$).

Figure 9:
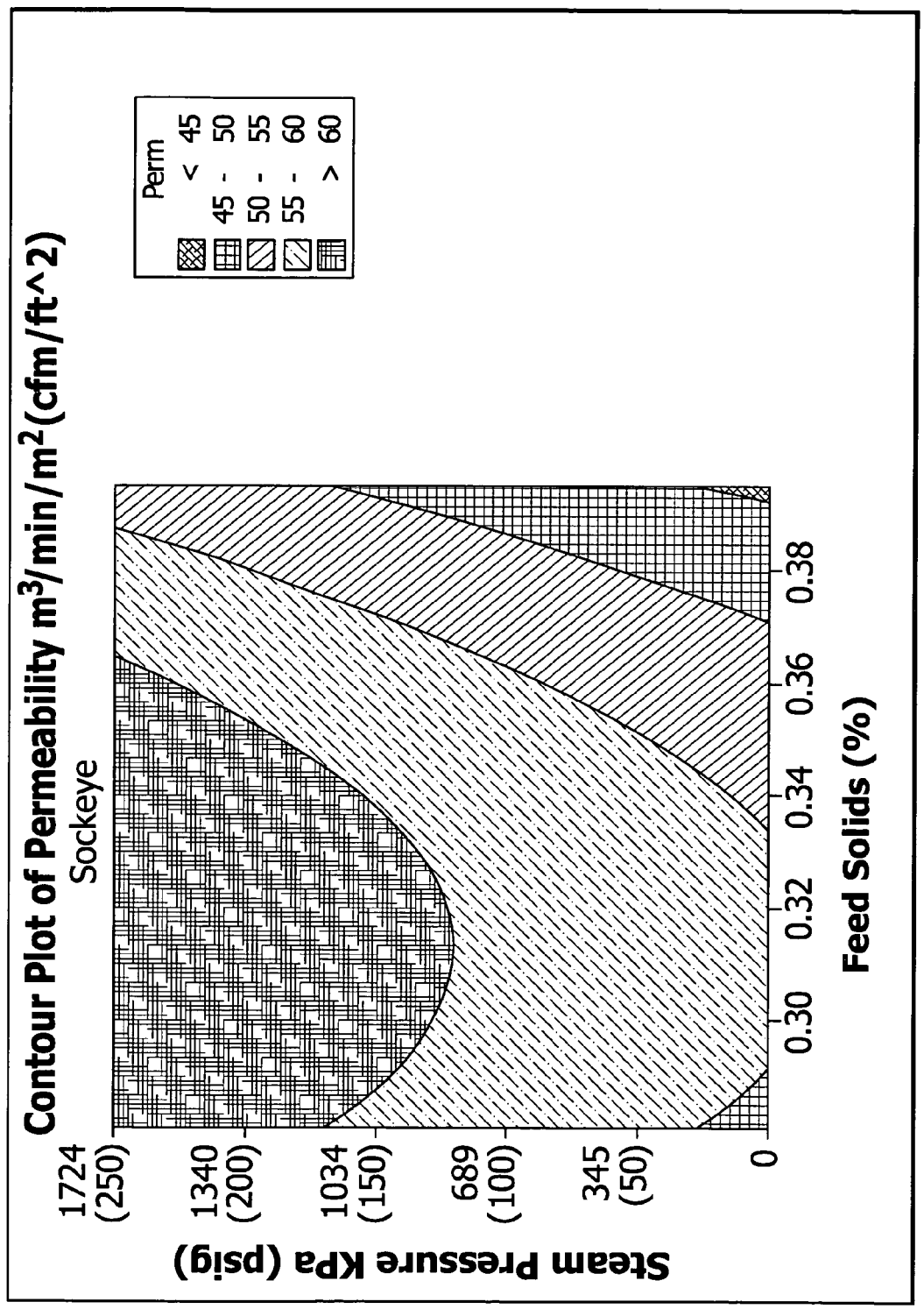
FIG. 9 is a contour plot of the estimated permeability of dried Douglas fir (Sockeye pulp) pulp versus manifold pressure and feed solids based on a response surface regression model equation.
Figure 10:
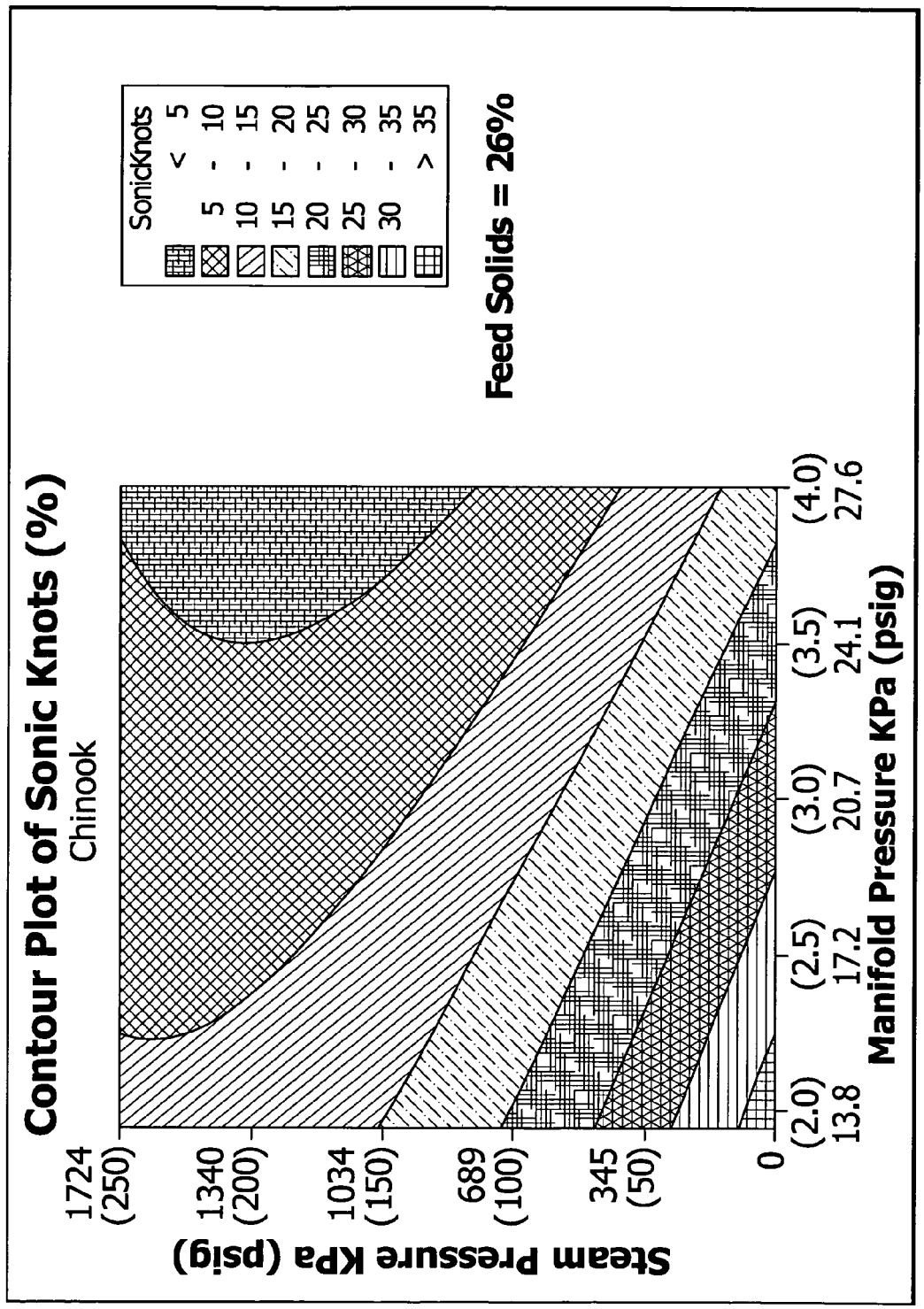
FIG. 10 is a contour plot of the estimated sonic knots for a mixture of spruce and pine (Chinook pulp) versus steam pressure and manifold pressure, for several feed solid settings, based on a response surface regression model equation.
Figure 11:
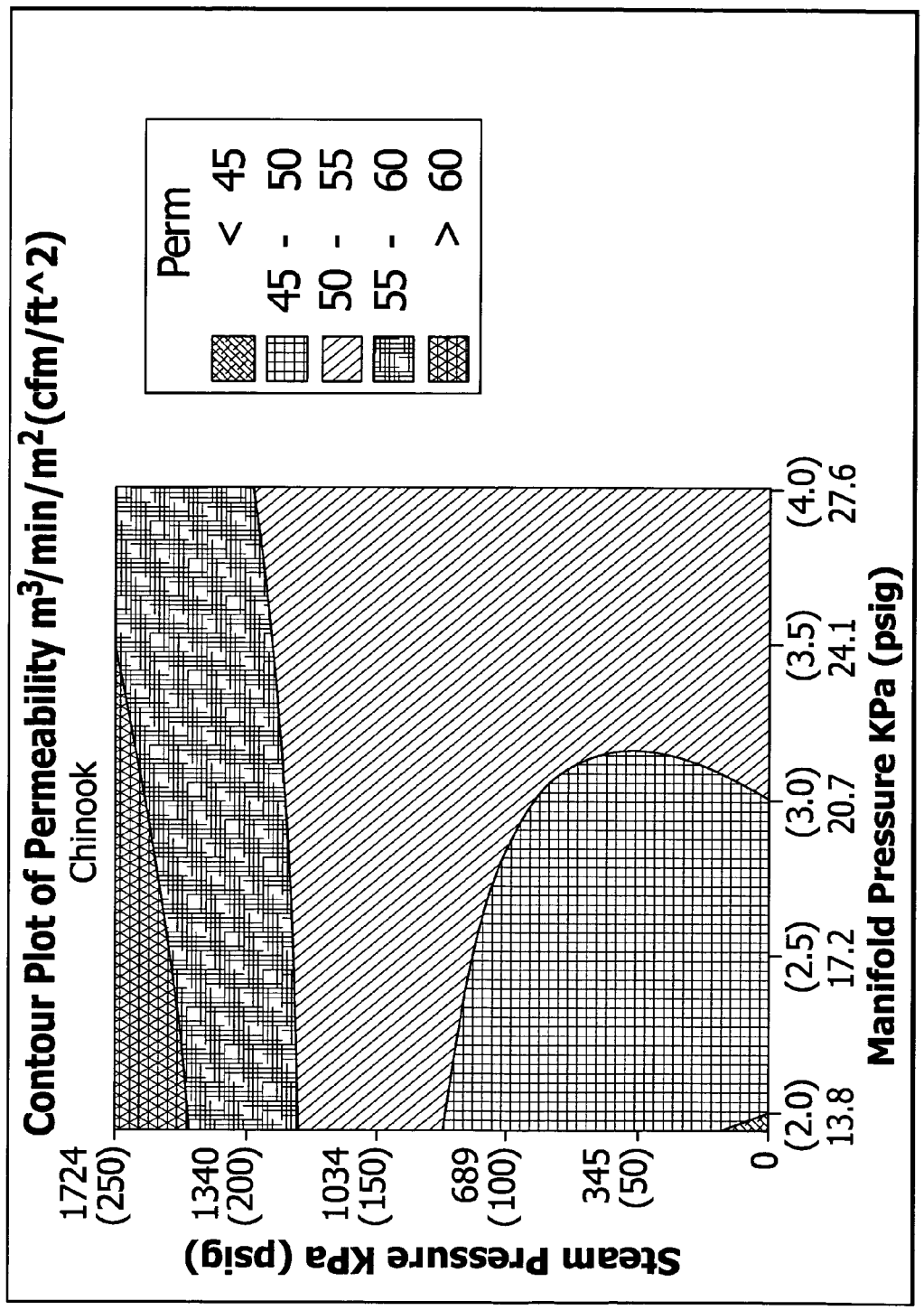
FIG. 11 is a contour plot of the estimated permeability of a dried mixture of spruce and pine (Chinook pulp) versus steam pressure and manifold pressure based on a response surface regression model equation.

The data from Tables 1 and 2 were analyzed using a response surface regression to show trends in Sockeye and Chinook pulp permeability (cfm/ft$^2$) due to changes in manifold pressure, steam pressure and feed solids. The contour plots based on the fitted model response surface regression equation are shown in FIGS. 9 (Sockeye pulp) and 11 (Chinook pulp). Highest permeability occurs with higher steam pressure (greater than 1034 KPa(150 psig)) and feed solids ranging from 28% to 36% for Sockeye pulp. Highest permeability occurs with higher steam pressure (greater than 1,551 Kpa (225 psig)) and manifold pressures ranging from 13.8 Kpa (2 psig) to 24.1 Kpa (3.5 psig) for the Chinook pulp. The statistical analysis and explanations for these results are presented in Tables 5 and 6.

TABLE 5

Permeability Results for SOCKEYE PULP
Response Surface Regression: Permeability versus
Steam Pressure and Feed Solids
The analysis was done using coded units.
Estimated Regression Coefficients for Perm

| Term | Coef | SE Coef | T | P |
|---|---|---|---|---|
| Constant | 59.081 | 1.427 | 41.406 | 0.000 |
| Steam Pressure | 4.409 | 1.170 | 3.770 | 0.001 |
| Feed Solids | −4.903 | 1.686 | −2.908 | 0.006 |
| FeedSolids * FeedSolids | −5.548 | 2.827 | −1.962 | 0.058 |

S = 5.829
R-Sq = 52.7%
R-Sq (adj) = 48.6%

The results of the response surface regression on the effect of steam pressure (psig) and feed solids (%) on permeability (cfm/ft$^2$) for Sockeye pulp are displayed. The R-Sq shows that 52.7% of the variability in the permeability is explained by the above statistical model. The regression analysis shows that steam pressure (psig), feed solids (%), and feed solids squared (quadratic effect) all have significant regression coefficients. This means that changes to these process settings have a significant effect on permeability for Sockeye pulp. The sign of the coefficient indicates the direction of the effect. For example, this model shows that increasing steam pressure increases permeability.

TABLE 6

Permeability Results for CHINOOK PULP
Response Surface Regression: Permeability versus
Steam Pressure and Manifold Pressure
The analysis was done using coded units.
Estimated Regression Coefficients for Permeability

| Term | Coef | SE Coef | T | P |
|---|---|---|---|---|
| Constant | 51.221 | 1.0728 | 47.743 | 0.000 |
| Manifold Pressure | 1.211 | 0.8663 | 1.398 | 0.172 |
| Steam Pressure | 5.705 | 1.2127 | 4.704 | 0.000 |
| SteamPress * SteamPress | 4.318 | 1.7700 | 2.440 | 0.021 |
| ManPress * SteamPress | −3.863 | 1.2339 | −3.131 | 0.004 |

S = 3.918
R-Sq = 62.8%
R-Sq (adj) = 57.8%

The results of the response surface regression on the effect of steam pressure (psig) and manifold pressure (psig) on permeability (cfm/ft$^2$) for Chinook pulp. The R-Sq shows that 62.8% of the variability in the permeability is explained by the above statistical model. The regression analysis shows that manifold pressure (psig), steam pressure (psig), steam pressure squared (quadratic effect) and manifold pressure by steam pressure interaction all have significant regression coefficients. This means that changes to these process settings have a significant effect on permeability for Chinook pulp. The sign of the coefficient indicates the direction of the effect. For example, this model shows increasing steam pressure increases permeability.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for producing singulated pulp fibers, comprising:
   introducing a never-dried, wet pulp, and air into a jet dryer that recirculates said pulp in a loop;
   heating said air prior to introduction into said dryer to a temperature of from about 250° C. to about 600° C.;
   injecting steam at a pressure of from 344 KPa (50 psig) to about 4,137 KPa (600 psig) into said jet dryer along with said wet pulp, and removing said pulp from said jet dryer and separating said pulp fibers from said air.

2. The process of claim 1, wherein said steam is injected at a pressure ranging from about 688 KPa (100 psig) to 2,758 KPa (400 psig).

3. The process of claim 1, wherein said steam is injected at a pressure of from about 896 KPa (130 psig) to 2,068 KPa (300 psig).

4. The process of claim 1, wherein said inlet temperature ranges from about 300° C. to about 400° C.

5. The process of claim 1, wherein the consistency of said wet pulp ranges from about 30% to about 40%.

6. The process of claim 1, wherein the manifold pressure of said air when introduced into said jet dryer ranges from about 1.4 KPa (2 psig) to about 103.5 KPa (15 psig).

7. The process of the claim 6, wherein said air is introduced at a pressure of about 20.7 KPa (3 psig) to about 34.5 KPa (5 psig).

8. The process of claim 1, wherein the outlet temperature of said pulp from said jet dryer ranges from about 110° C. to about 200° C.

* * * * *